(12) United States Patent
Lawson et al.

(10) Patent No.: US 9,560,903 B2
(45) Date of Patent: *Feb. 7, 2017

(54) PROTECTIVE CASE WITH COMPARTMENT INCLUDING SPRING

(71) Applicant: OTTER PRODUCTS, LLC, Fort Collins, CO (US)

(72) Inventors: Rebecca Lawson, Cork (IE); Jonathan B. Rayeski, Fort Collins, CO (US); Larry Holmes, Fort Collins, CO (US); William T. Smith, Fort Collins, CO (US); John P. Fitzgerald, Fort Collins, CO (US); Lucas B. Weller, Fort Collins, CO (US); Kevin W. Witter, Fort Collins, CO (US); Peter J. Gronewoller, Fort Collins, CO (US)

(73) Assignee: Otter Products, LLC, Fort Collins, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/962,304

(22) Filed: Dec. 8, 2015

(65) Prior Publication Data

US 2016/0088912 A1    Mar. 31, 2016

Related U.S. Application Data

(63) Continuation of application No. 14/281,705, filed on May 19, 2014, now Pat. No. 9,241,551.

(Continued)

(51) Int. Cl.
*A45C 11/00* (2006.01)
*A45D 33/26* (2006.01)
(Continued)

(52) U.S. Cl.
CPC .............. *A45C 11/00* (2013.01); *A45C 11/182* (2013.01); *A45C 13/008* (2013.01); *A45C 13/02* (2013.01);
(Continued)

(58) Field of Classification Search
CPC ........... A45C 1/06; A45C 11/00; A45C 11/18; A45C 11/182; A45C 13/008; A45C 13/02; A45C 2011/00; A45C 2011/002; A45C 2011/003; A45C 2011/188; A45D 33/26; G06F 1/1626; G06F 2200/1633; H04B 1/38; H04B 1/3888; H04M 1/00
(Continued)

(56) References Cited

U.S. PATENT DOCUMENTS 3,665,991 A    5/1972  Gillemot et al.
4,097,878 A    6/1978  Cramer
(Continued)

FOREIGN PATENT DOCUMENTS

WO    9400037 A1    1/1994
WO    9941958 A1    8/1999
WO    2007122722 A1    11/2007

*Primary Examiner* — Bryon Gehman

(57) ABSTRACT

A protective case for an electronic device, the protective case having a cushion layer that covers a back surface, a left side surface, a right side surface, a top side surface, and a bottom side surface of the electronic device. A structural layer has a back portion and side wall portions that extend from the back portion and surrounds the cushion layer. A sliding drawer is attached to an outer surface of the back portion of the structural layer. The sliding drawer has a compartment that can store one or more items in the protective case. The sliding drawer can make the items accessible when open and concealed when closed.

10 Claims, 20 Drawing Sheets

Related U.S. Application Data

(60) Provisional application No. 61/887,924, filed on Oct. 7, 2013.

(51) Int. Cl.
*G06F 1/16* (2006.01)
*A45C 11/18* (2006.01)
*A45C 13/00* (2006.01)
*A45C 13/02* (2006.01)
*A45C 1/06* (2006.01)

(52) U.S. Cl.
CPC .............. *A45D 33/26* (2013.01); *G06F 1/1626* (2013.01); *A45C 1/06* (2013.01); *A45C 2011/002* (2013.01); *A45C 2011/003* (2013.01); *A45C 2011/188* (2013.01); *G06F 2200/1633* (2013.01)

(58) Field of Classification Search
USPC .......... 206/38, 38.1, 39–39.8, 320; 455/90.3, 455/575.1, 575.8
See application file for complete search history.

(56) References Cited

U.S. PATENT DOCUMENTS

| | | |
|---|---|---|
| 4,352,968 A | 10/1982 | Pounds |
| 4,375,323 A | 3/1983 | Inagaki et al. |
| 4,450,955 A * | 5/1984 | Featherston ......... A45C 11/182 206/39.6 |
| 4,703,161 A | 10/1987 | McLean |
| 4,733,776 A | 3/1988 | Ward |
| 4,762,227 A | 8/1988 | Patterson |
| 4,836,256 A | 6/1989 | Meliconi |
| 5,002,184 A | 3/1991 | Lloyd |
| 5,025,921 A | 6/1991 | Gasparaitis et al. |
| 5,123,044 A | 6/1992 | Tate |
| 5,175,873 A | 12/1992 | Goldenberg et al. |
| 5,360,108 A | 11/1994 | Alagia |
| 5,368,159 A | 11/1994 | Doria |
| 5,380,968 A | 1/1995 | Morse |
| 5,386,084 A | 1/1995 | Risko |
| 5,388,691 A | 2/1995 | White |
| 5,388,692 A | 2/1995 | Withrow et al. |
| 5,505,328 A | 4/1996 | Stribiak |
| 5,573,164 A | 11/1996 | Law |
| 5,583,742 A | 12/1996 | Noda et al. |
| 5,648,757 A | 7/1997 | Vernace et al. |
| 5,884,772 A | 3/1999 | Floyd et al. |
| 5,950,816 A | 9/1999 | Reid |
| 6,031,524 A | 2/2000 | Kunert |
| 6,041,924 A | 3/2000 | Tajima |
| 6,068,119 A | 5/2000 | Derr et al. |
| 6,073,770 A | 6/2000 | Park |
| 6,094,785 A | 8/2000 | Montgomery et al. |
| 6,201,867 B1 | 3/2001 | Koike |
| 6,304,459 B1 | 10/2001 | Toyosato et al. |
| 6,305,656 B1 | 10/2001 | Wemyss |
| 6,317,313 B1 | 11/2001 | Mosgrove et al. |
| 6,375,009 B1 | 4/2002 | Lee |
| 6,445,577 B1 | 9/2002 | Madsen et al. |
| 6,447,140 B1 | 9/2002 | Lu |
| 6,456,487 B1 | 9/2002 | Hetterick |
| 6,471,056 B1 | 10/2002 | Tzeng |
| 6,536,589 B2 | 3/2003 | Chang |
| 6,616,111 B1 | 9/2003 | White |
| 6,701,159 B1 | 3/2004 | Powell |
| 6,731,913 B2 | 5/2004 | Humphreys et al. |
| 6,781,825 B2 | 8/2004 | Shih et al. |
| 6,962,454 B1 | 11/2005 | Costello |
| 6,971,517 B2 | 12/2005 | Chen |
| 6,980,777 B2 | 12/2005 | Shepherd et al. |
| 7,004,312 B2 * | 2/2006 | Chen ..................... A45C 11/18 206/39.5 |
| 7,046,230 B2 | 5/2006 | Zadesky et al. |
| 7,050,841 B1 | 5/2006 | Onda |
| 7,069,063 B2 | 6/2006 | Halkosaari et al. |
| 7,085,542 B2 | 8/2006 | Dietrich et al. |
| 7,146,701 B2 | 12/2006 | Mahoney et al. |
| 7,194,202 B2 | 3/2007 | Funahashi et al. |
| 7,194,291 B2 | 3/2007 | Peng |
| 7,225,923 B2 | 6/2007 | Hallee et al. |
| 7,229,300 B2 * | 6/2007 | Lai ......................... H01R 27/00 439/155 |
| 7,230,823 B2 | 6/2007 | Richardson et al. |
| 7,236,588 B2 | 6/2007 | Gartrell |
| 7,255,228 B2 | 8/2007 | Kim |
| 7,312,984 B2 | 12/2007 | Richardson et al. |
| 7,343,184 B2 | 3/2008 | Rostami |
| 7,400,917 B2 | 7/2008 | Wood et al. |
| D574,819 S | 8/2008 | Andre et al. |
| D575,056 S | 8/2008 | Tan |
| 7,418,278 B2 | 8/2008 | Eriksson et al. |
| 7,428,427 B2 | 9/2008 | Brunstrom et al. |
| 7,449,650 B2 | 11/2008 | Richardson et al. |
| D582,149 S | 12/2008 | Tan |
| 7,495,895 B2 | 2/2009 | Carnevali |
| 7,540,844 B2 | 6/2009 | Muser |
| 7,555,325 B2 | 6/2009 | Goros |
| D597,089 S | 7/2009 | Khan et al. |
| 7,594,576 B2 | 9/2009 | Chen et al. |
| 7,609,512 B2 | 10/2009 | Richardson et al. |
| D603,603 S | 11/2009 | Laine et al. |
| 7,623,898 B2 | 11/2009 | Holmberg |
| D606,751 S | 12/2009 | Andre et al. |
| 7,630,746 B2 | 12/2009 | Holmberg |
| 7,663,878 B2 | 2/2010 | Swan et al. |
| 7,663,879 B2 | 2/2010 | Richardson et al. |
| D616,430 S | 5/2010 | Fathollahi |
| D622,716 S | 8/2010 | Andre et al. |
| D623,180 S | 9/2010 | Diebel |
| D624,532 S | 9/2010 | Huskinson |
| D624,908 S | 10/2010 | Huskinson |
| D624,909 S | 10/2010 | Huskinson |
| 7,933,122 B2 | 4/2011 | Richardson et al. |
| 8,204,561 B2 | 6/2012 | Mongan et al. |
| 8,267,251 B2 * | 9/2012 | Mongan .................. A45C 11/00 206/38 |
| 8,418,852 B2 * | 4/2013 | Ziemba ................... A45C 1/04 206/235 |
| D682,817 S | 5/2013 | Murchison et al. |
| 8,499,933 B2 | 8/2013 | Ziemba |
| 8,584,847 B2 | 11/2013 | Tages et al. |
| 8,596,449 B2 * | 12/2013 | Mongan ............... A45C 11/182 206/320 |
| 8,833,379 B1 | 9/2014 | Kaplan |
| 2002/0065054 A1 | 5/2002 | Humphreys et al. |
| 2002/0079244 A1 | 6/2002 | Kwong |
| 2002/0085342 A1 | 7/2002 | Chen et al. |
| 2002/0086702 A1 | 7/2002 | Lai et al. |
| 2003/0103624 A1 | 6/2003 | Hu |
| 2003/0151890 A1 | 8/2003 | Huang et al. |
| 2004/0014506 A1 | 1/2004 | Kemppinen |
| 2005/0247584 A1 | 11/2005 | Lu |
| 2005/0279655 A1 | 12/2005 | Chen |
| 2005/0279661 A1 | 12/2005 | Hodges |
| 2006/0160423 A1 * | 7/2006 | Lee ....................... G06K 13/08 439/630 |
| 2006/0255493 A1 | 11/2006 | Fouladpour |
| 2007/0071423 A1 | 3/2007 | Fantone et al. |
| 2007/0115387 A1 | 5/2007 | Ho |
| 2007/0158220 A1 | 7/2007 | Cleereman et al. |
| 2008/0039161 A1 | 2/2008 | Chan |
| 2008/0163463 A1 | 7/2008 | Hulden |
| 2008/0316687 A1 | 12/2008 | Richardson et al. |
| 2009/0009945 A1 | 1/2009 | Johnson et al. |
| 2009/0034169 A1 | 2/2009 | Richardson et al. |
| 2009/0111543 A1 | 4/2009 | Tai et al. |
| 2009/0113758 A1 | 5/2009 | Nishiwaki et al. |
| 2009/0283184 A1 | 11/2009 | Han |
| 2010/0096284 A1 | 4/2010 | Bau |
| 2010/0104814 A1 | 4/2010 | Richardson et al. |

(56) References Cited

U.S. PATENT DOCUMENTS

2010/0203931 A1 8/2010 Hynecek et al.
2012/0314354 A1 12/2012 Rayner

* cited by examiner

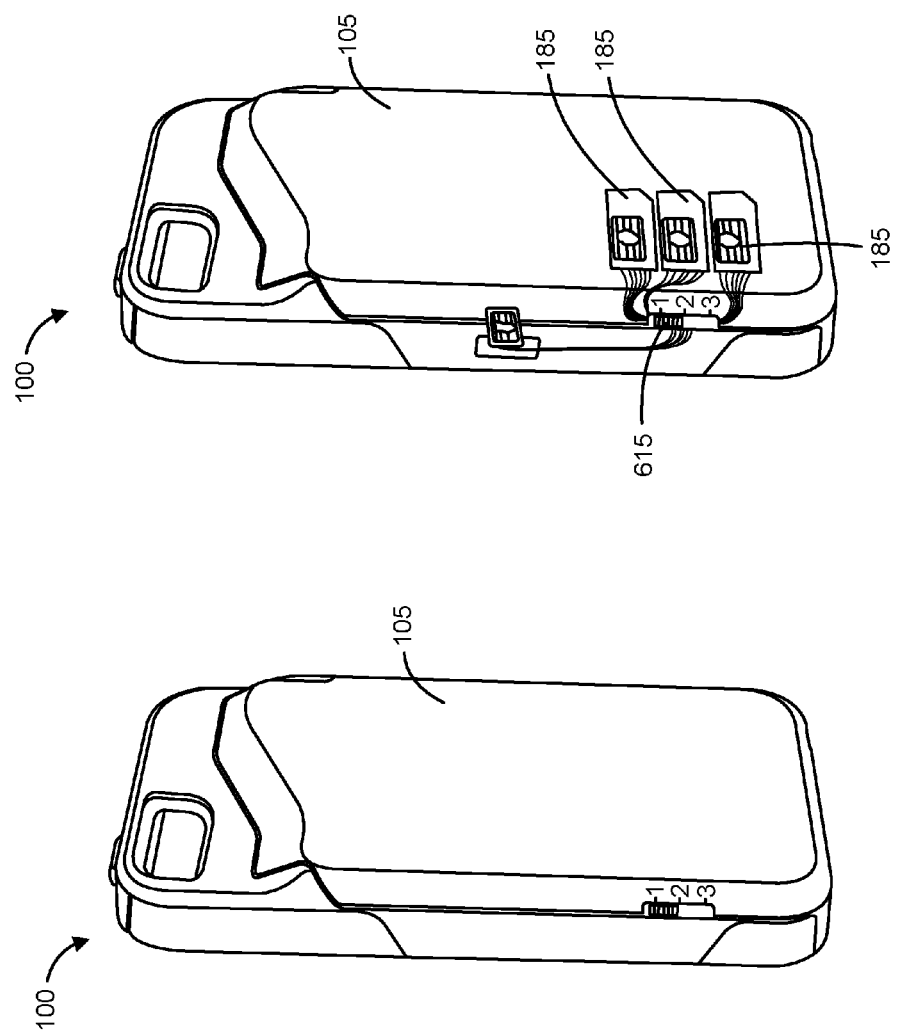

PROTECTIVE CASE WITH COMPARTMENT INCLUDING SPRING

CROSS-REFERENCE TO RELATED APPLICATIONS

This application is a continuation of U.S. patent application Ser. No. 14/281,705, filed on May 19, 2014, which claims priority to U.S. Provisional Patent Application No. 61/887,924, filed Oct. 7, 2013, the content of each hereby incorporated by reference in their entireties.

BACKGROUND

Personal electronic devices are commonly used for communication and entertainment purposes. Examples of personal electronic devices include smartphones, tablets, audio players, video players, cameras, portable computers, two-way radios, and GPS receivers. As these devices become an increasingly important part of peoples' daily activities, it is desirable to create new protective cases that not only protect electronic devices from damage, but also serve other useful purposes.

BRIEF DESCRIPTIONS OF DRAWINGS

FIG. 1 shows three views of a protective case with a compartment for storing items. The upper left view shows a rear perspective view of the protective case. The upper right view shows a front perspective view of the protective case. The lower view shows a side perspective view of the protective case with a sliding drawer in an open position.

Figure 3:
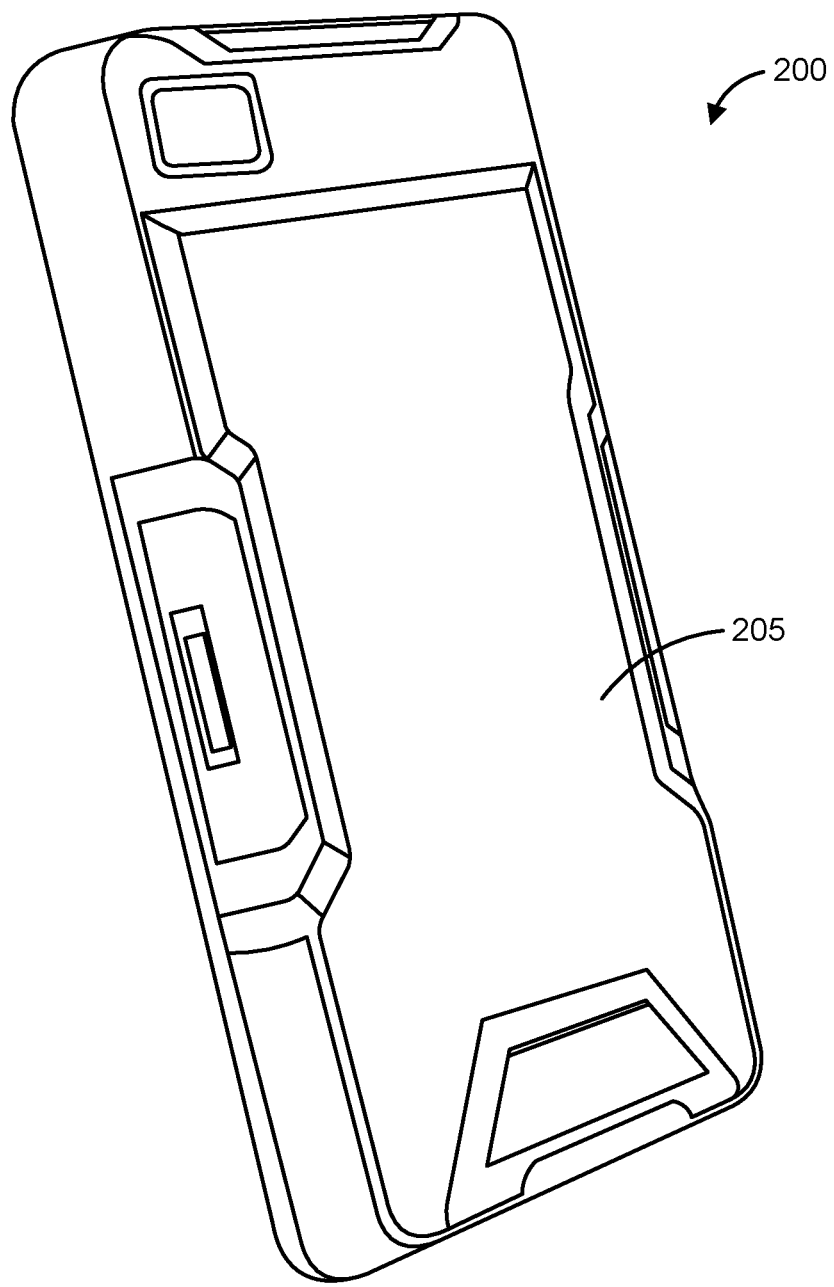
FIG. 3 shows a rear perspective view of a protective case with a compartment.
Figure 5:
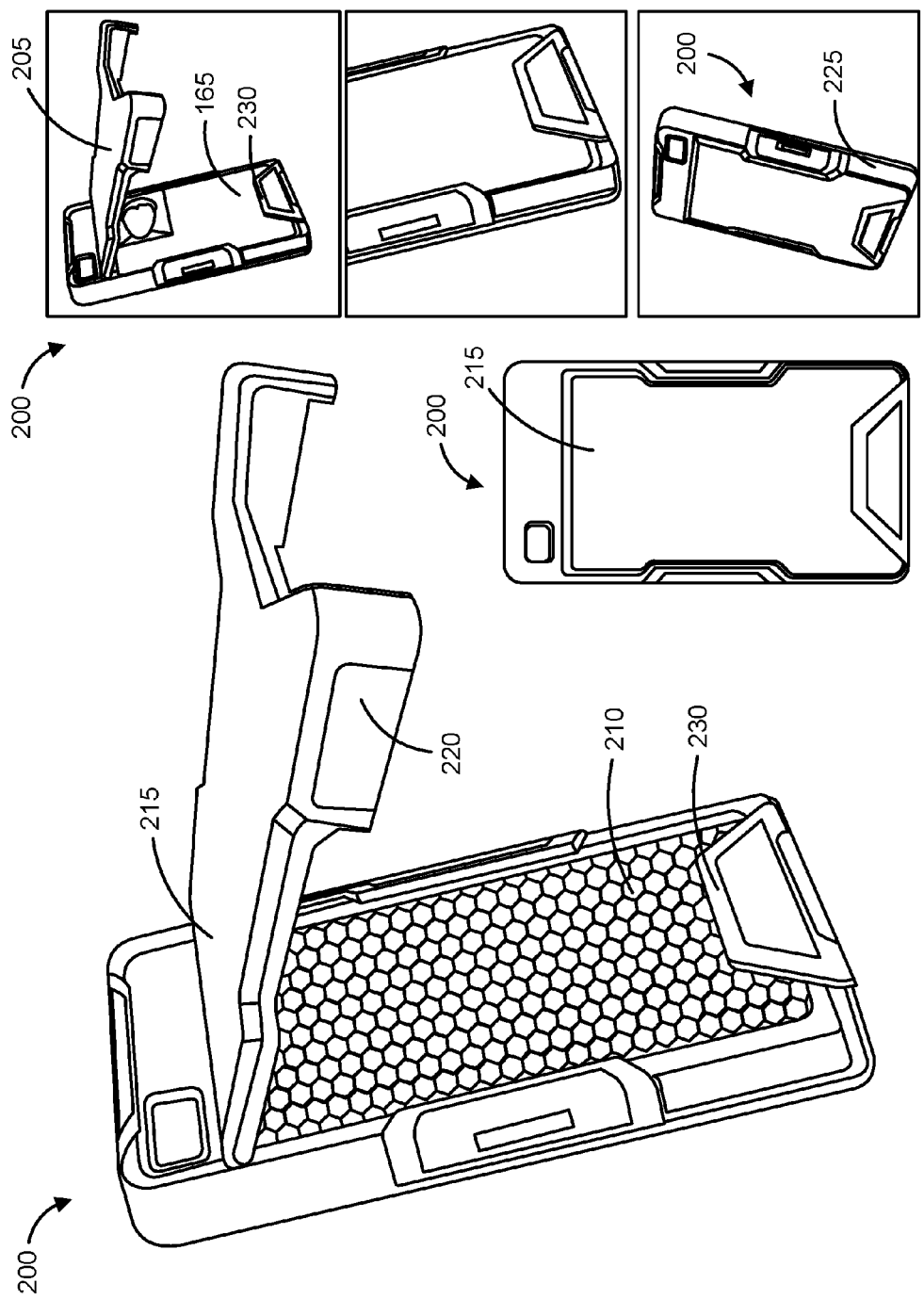

FIG. 5 shows five rear views of the protective case of FIG. 3 with a compartment door in open and closed positions. The leftmost view shows a rear perspective view of the protective case with the compartment door in an open position. The lower central view shows a rear view of the protective case with the compartment door in a closed position. The upper right view shows a rear perspective view of the protective case with the compartment door in an open position exposing a driver's license stored within the compartment. The middle right view shows a partial rear perspective view of the protective case with the compartment door in an open position. The lower right view shows a rear perspective view of the protective case with the compartment door in a closed position.

Figure 6:
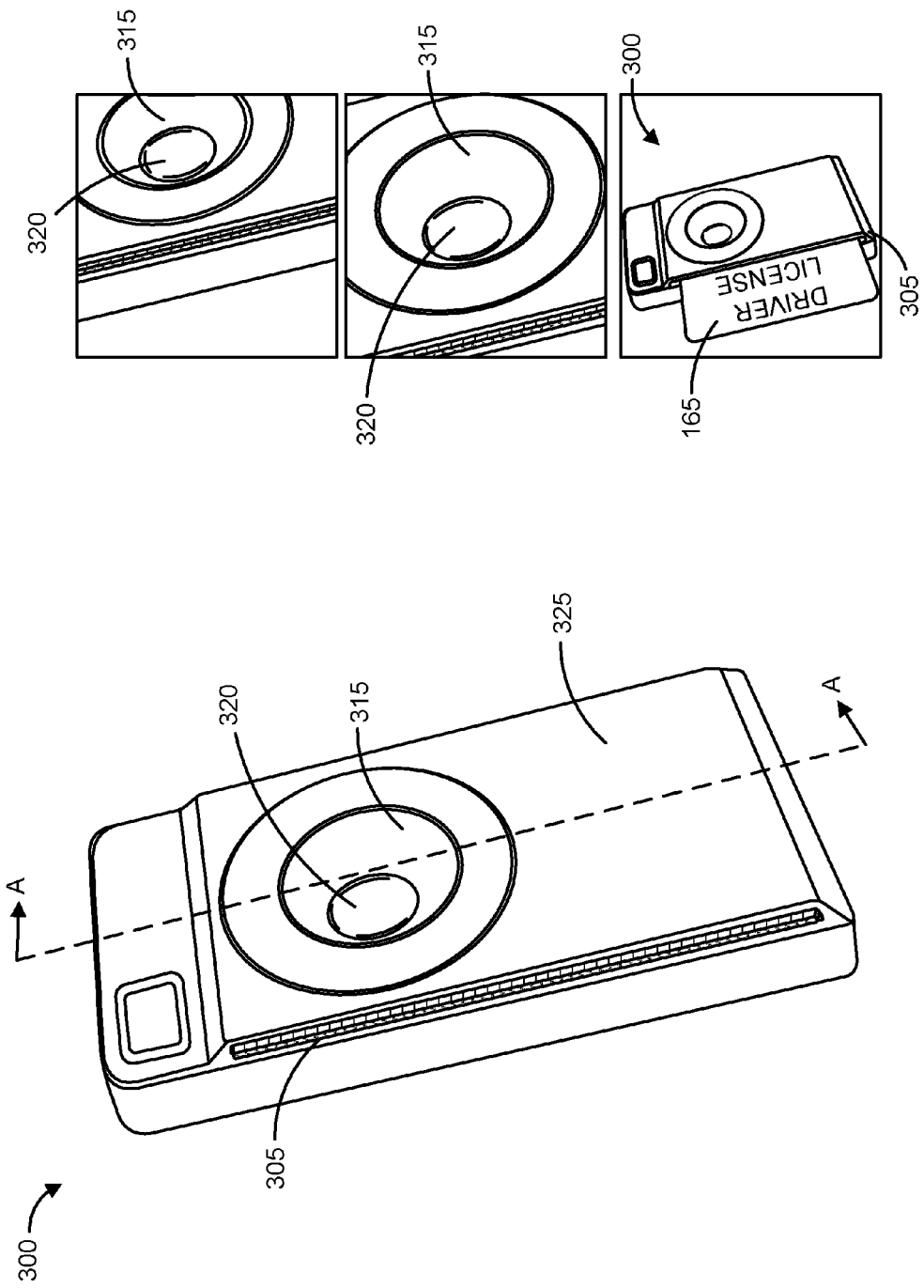

FIG. 6 shows four rear perspective views of a protective case with a first slot configured to receive and store a first card and a second slot configured to receive and store a second card.

Figure 7A:
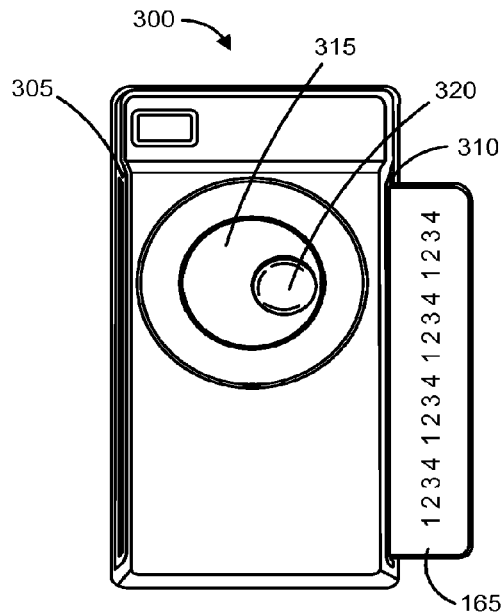
Figure 7B:
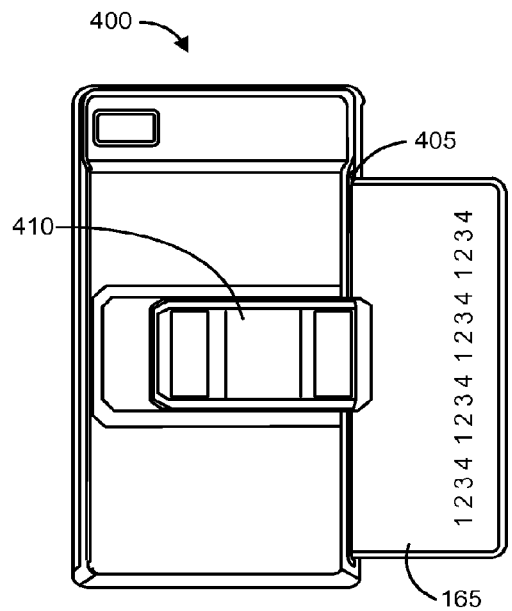
Figure 7C:
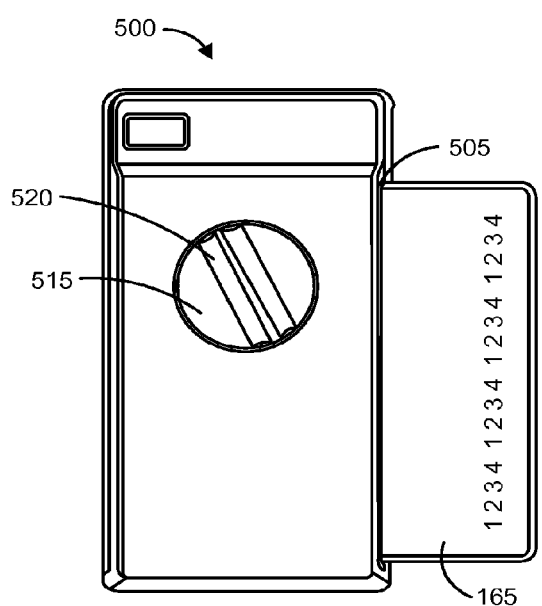

FIG. 7A-7C show three protective cases, each having a slot configured to receive a card, and each having a mechanism for ejecting the card from the slot.

Figure 8:
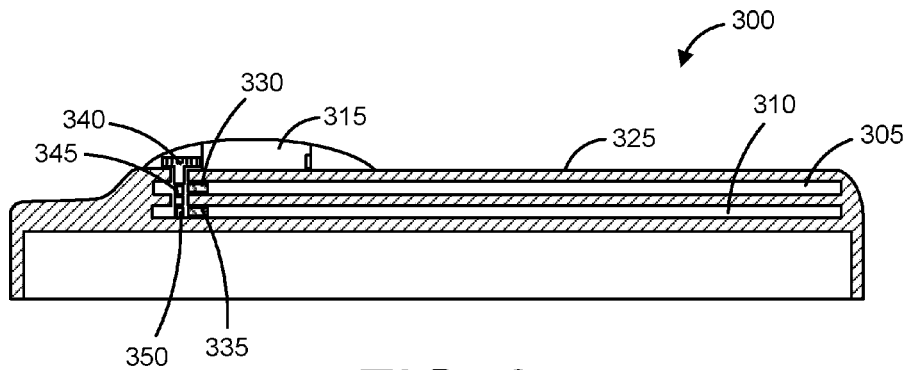

FIG. 8 shows a side cross-sectional view of the protective case of FIG. 6 taken along section A-A and exposing a first slot and a second slot within the protective case, where the first and second slots are each configured to receive and store a card.

Figure 9:
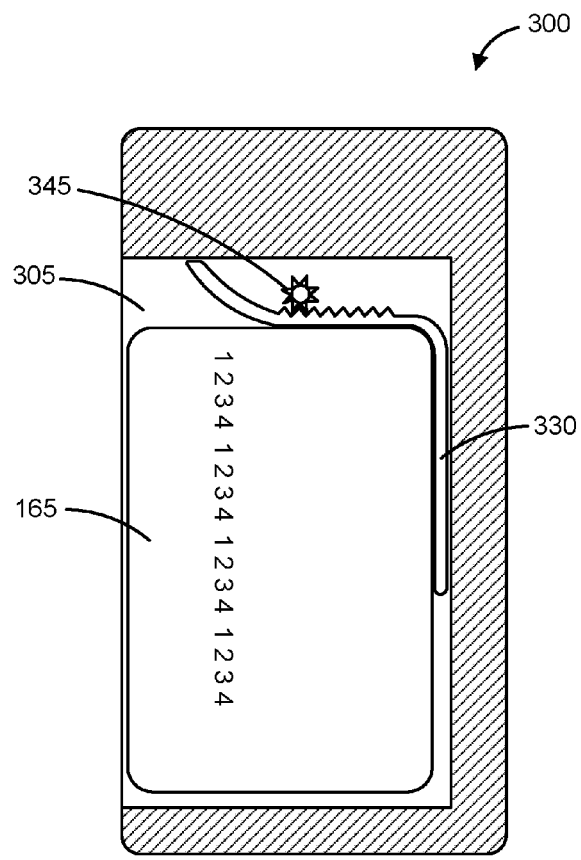

FIG. 9 shows a rear cross-sectional view of the protective case of FIG. 6 exposing a portion of a rack and pinion style ejection mechanism and a credit card positioned within the first slot, where the section is taken along a plane that is parallel to and offset from a rear planar surface of the protective case and perpendicular to both the top and bottom planar surfaces of the protective case.

Figure 10:
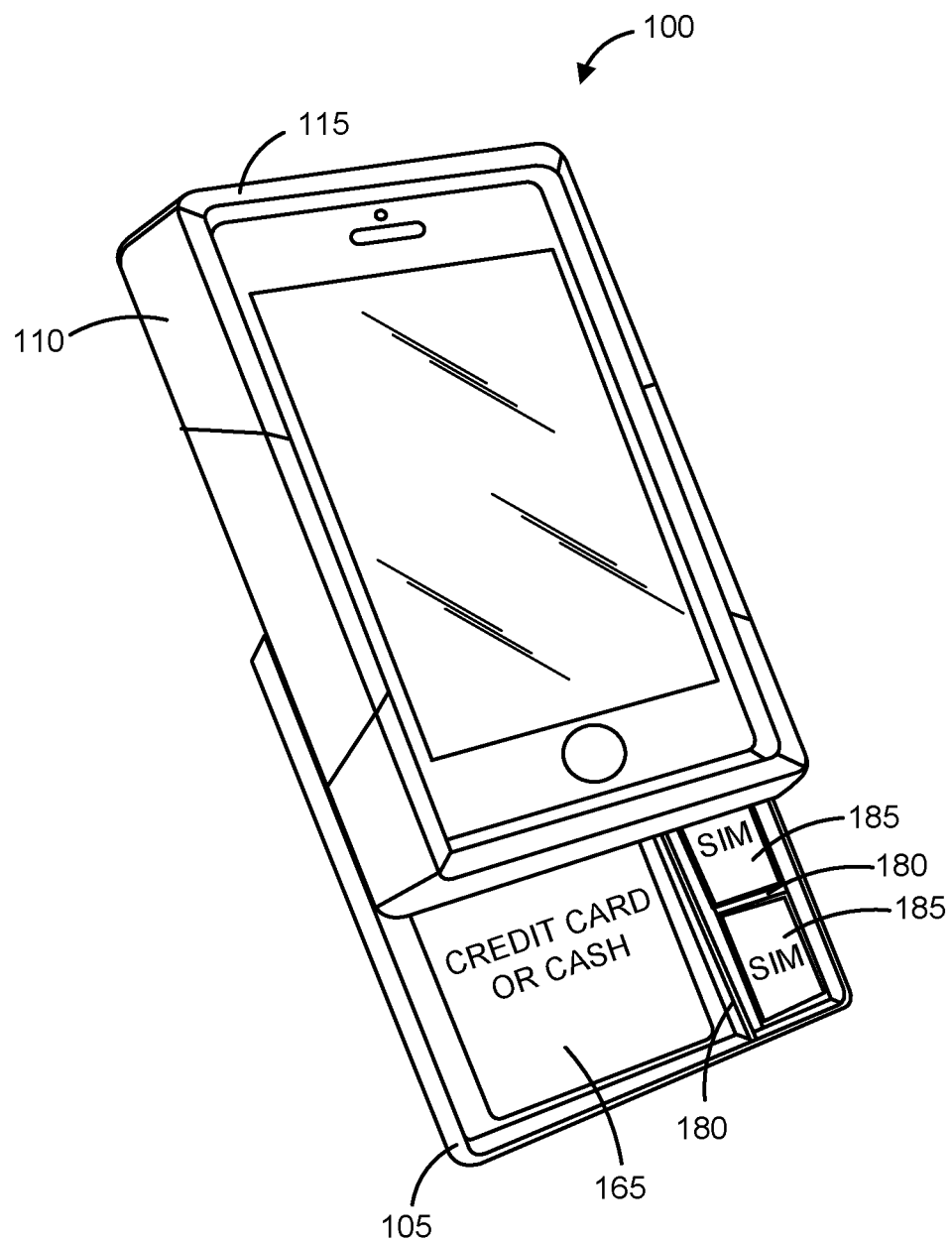

FIG. 10 shows a front perspective view of a protective case with a compartment door in a partially open position revealing dedicated locations for storing credit cards, cash, and subscriber identity module ("SIM") cards within the compartment.

Figure 11:
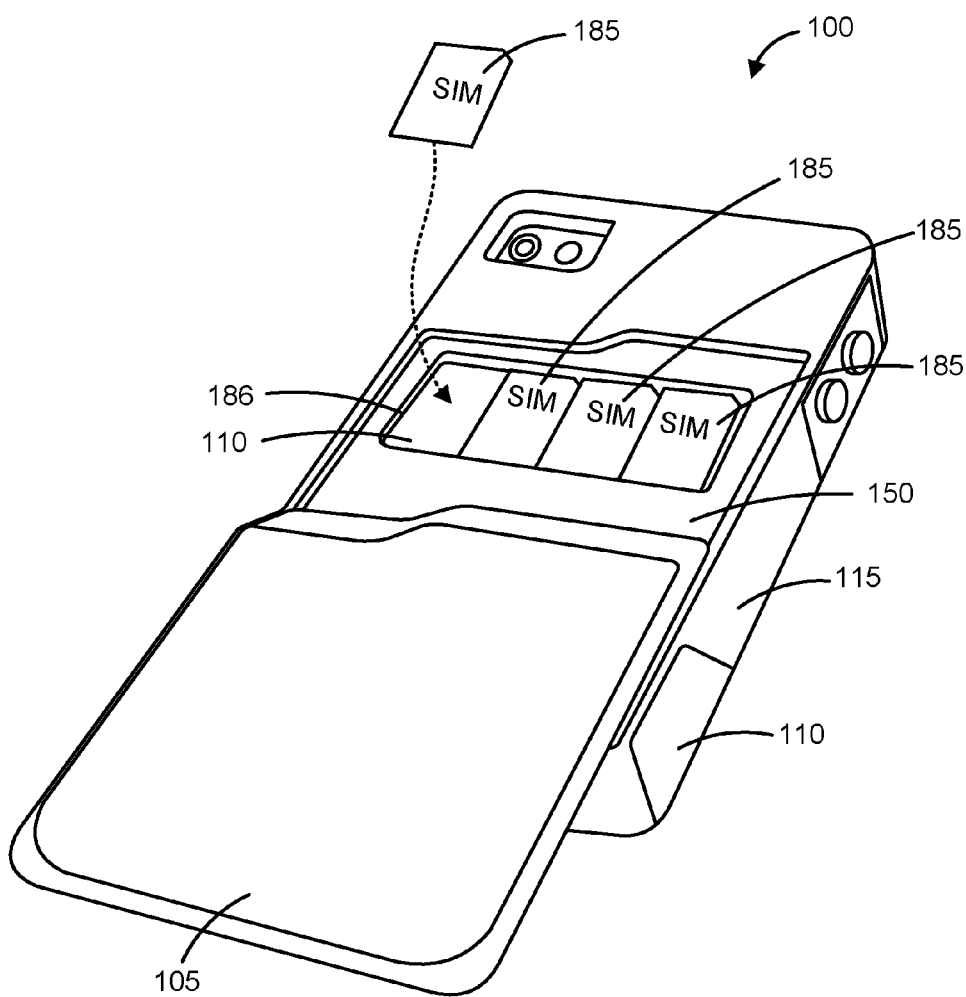

FIG. 11 shows a rear perspective view of a protective case with a compartment door in an open position revealing four pass through locations adapted to receive one or more SIM cards against a flexible cushion layer.

Figure 12:
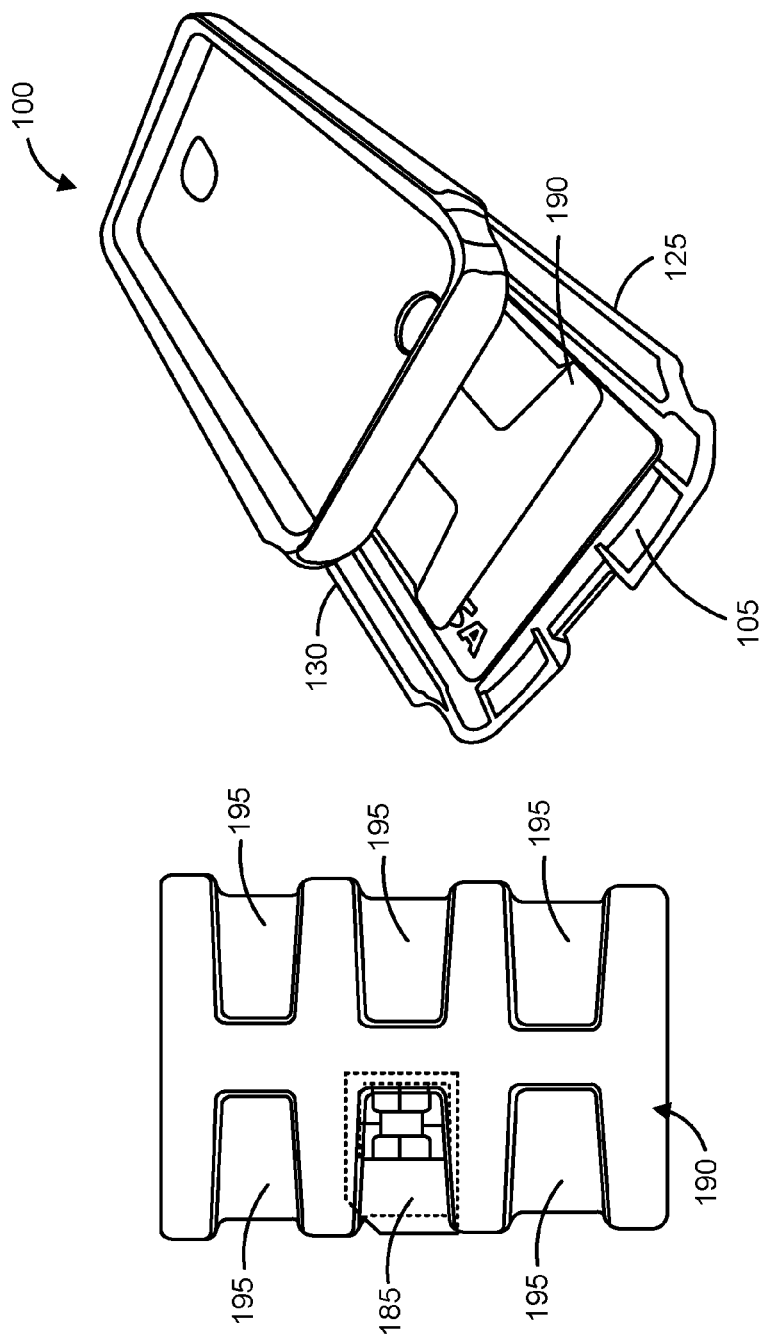

FIG. 12 shows an enlarged front view of a SIM card storage unit beside a front perspective view of a protective case with a compartment door in an open position revealing a removable SIM card storage unit positioned within a compartment in the protective case.

Figure 13:
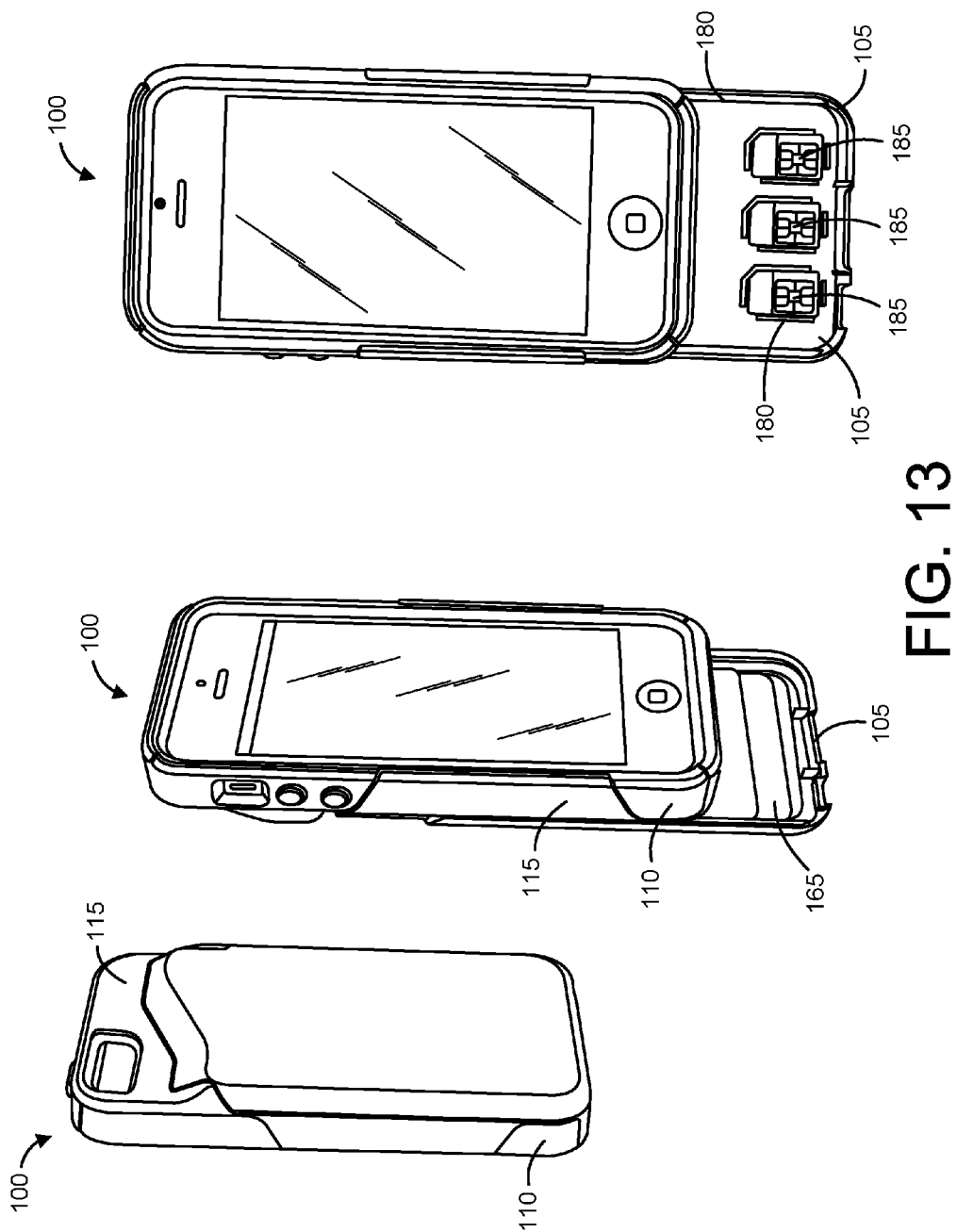

FIG. 13 shows three views of a protective case, each having a compartment with storage slots adapted to receive and store items. The leftmost view shows a rear perspective view of a protective case with a compartment door in a closed position. The center view shows a front perspective view of a protective case housing an electronic device, where the protective case has a compartment door in an open position exposing a card. The rightmost view shows a front view of a protective case housing an electronic device and having a compartment door in an open position exposing three SIM cards arranged side by side within a compartment.

Figure 14:
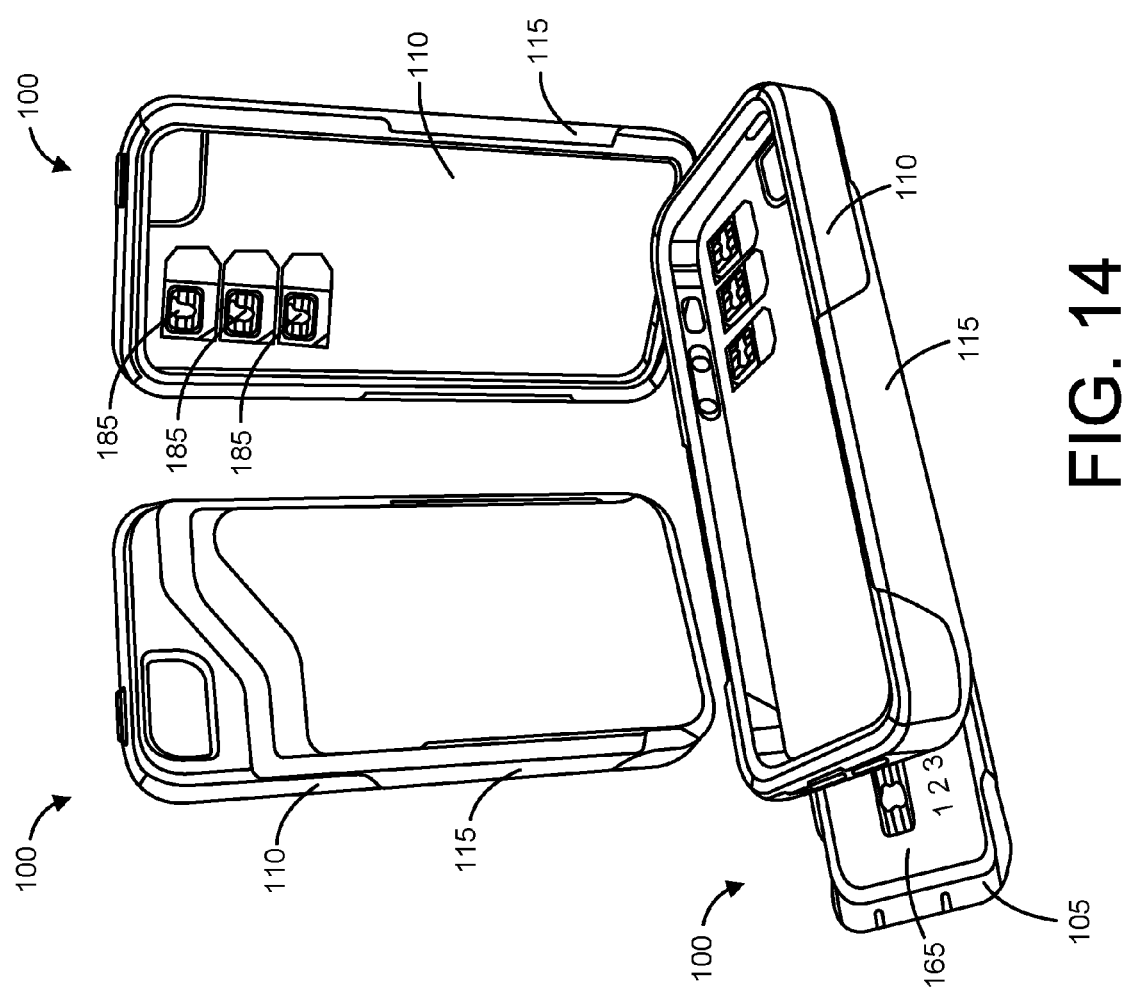

FIG. 14 shows three views of a protective case with a compartment to store items and pockets within an interior surface of the case, where the pockets are configured to capture and safely store one or more SIM cards. The upper left view shows a rear perspective view of a protective case with a compartment door in a closed position. The upper right view shows a front perspective view of a protective case containing three SIM cards, each stored in a pocket disposed within an interior surface of the protective case. The lower view shows a side perspective view of a protective case containing three SIM cards, each stored in a pocket disposed within an interior surface of the protective case, and a credit card disposed in a compartment formed in a sliding compartment door.

Figure 15:
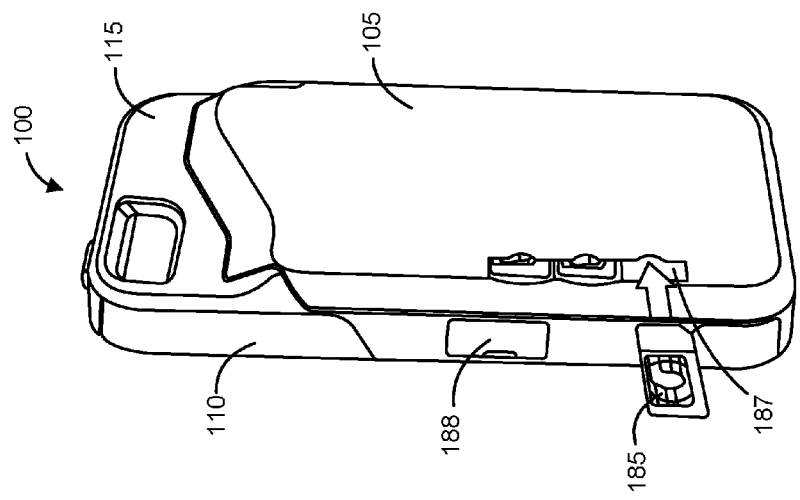
Figure 15:
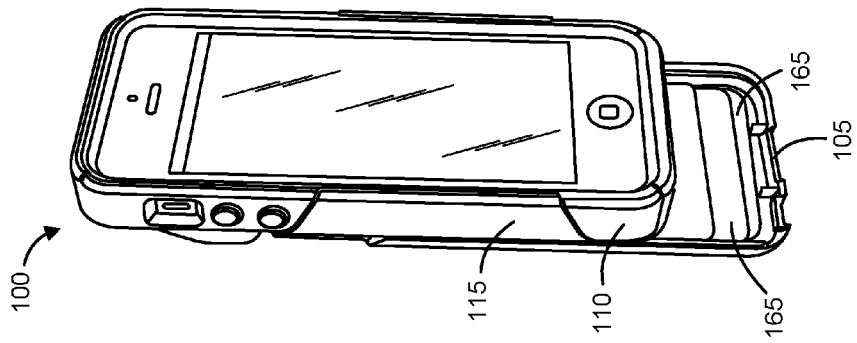

FIG. 15 shows a front perspective view and a rear perspective view of a protective case with a compartment, where the case includes dedicated storage slots for SIM cards in a rear portion of the case.

Figure 16:
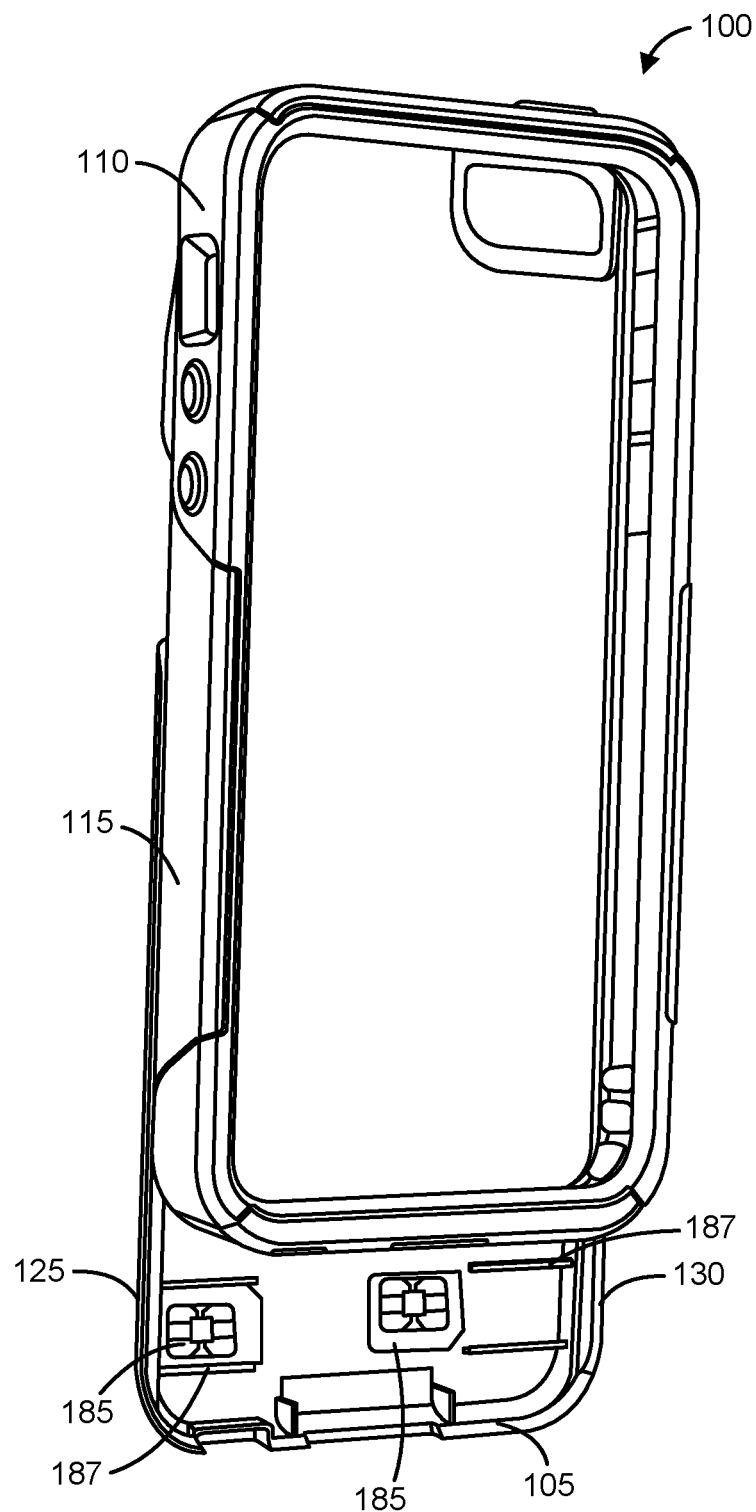

FIG. 16 shows a front perspective view of a protective case with a compartment, where the case includes storage slots for one or more SIM cards in the sliding drawer.

Figure 17:
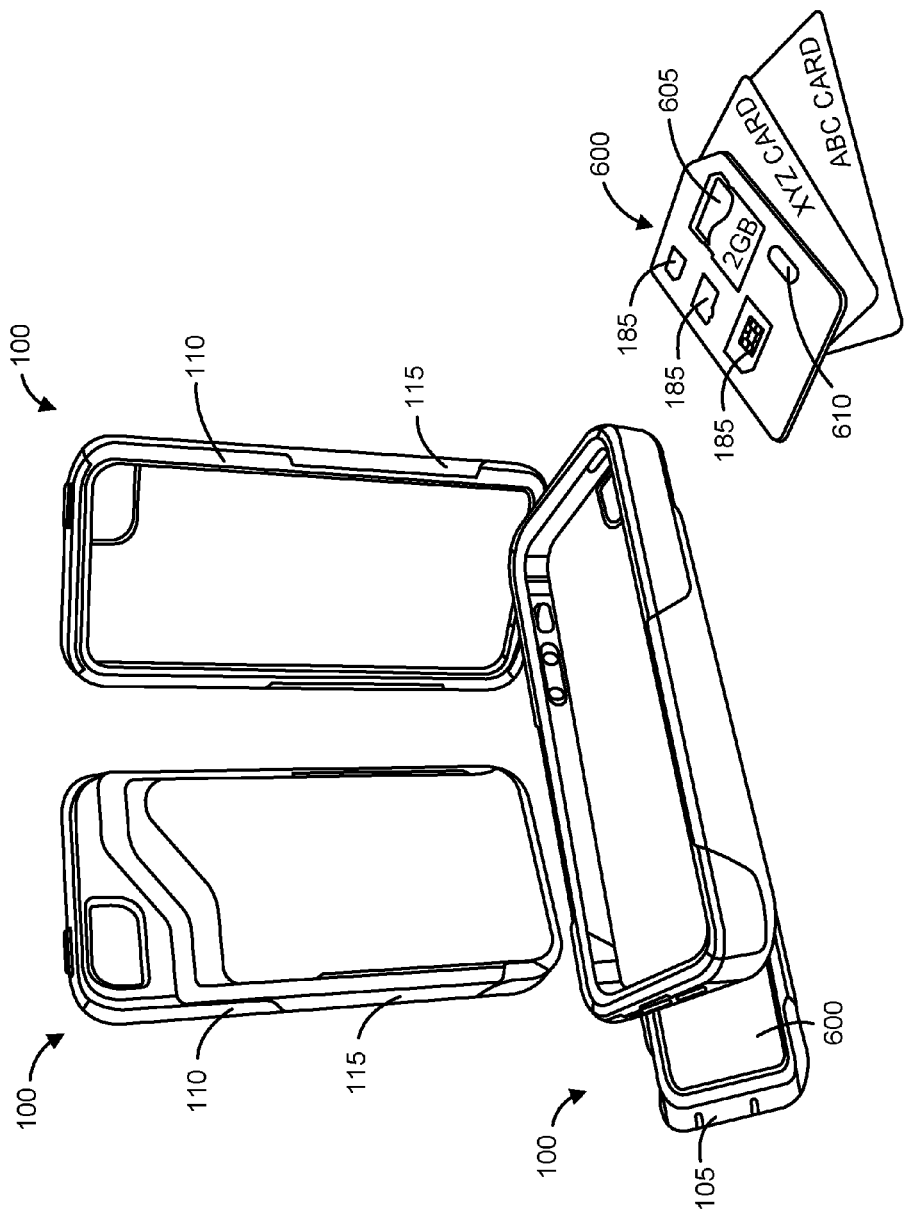

FIG. 17 shows three views of a protective case with a compartment, where the compartment is adapted to receive a credit card, identification card, or a storage tray containing a plurality of memory storing devices.

Figure 18:
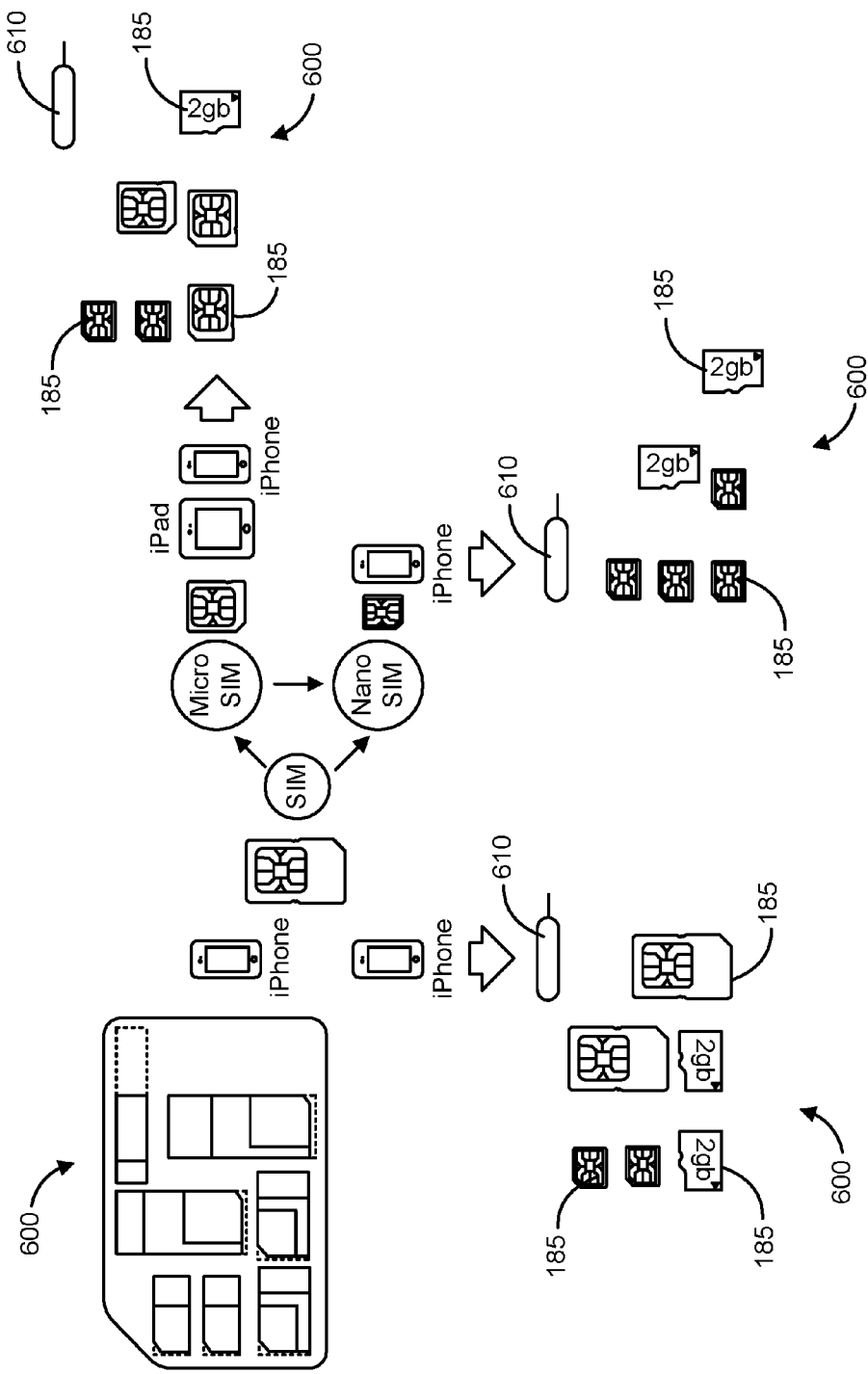

FIG. 18 shows a storage tray that is adapted to receive one or more of a SIM card, micro SIM card, nano SIM card, and micro SD card.

Figure 19:
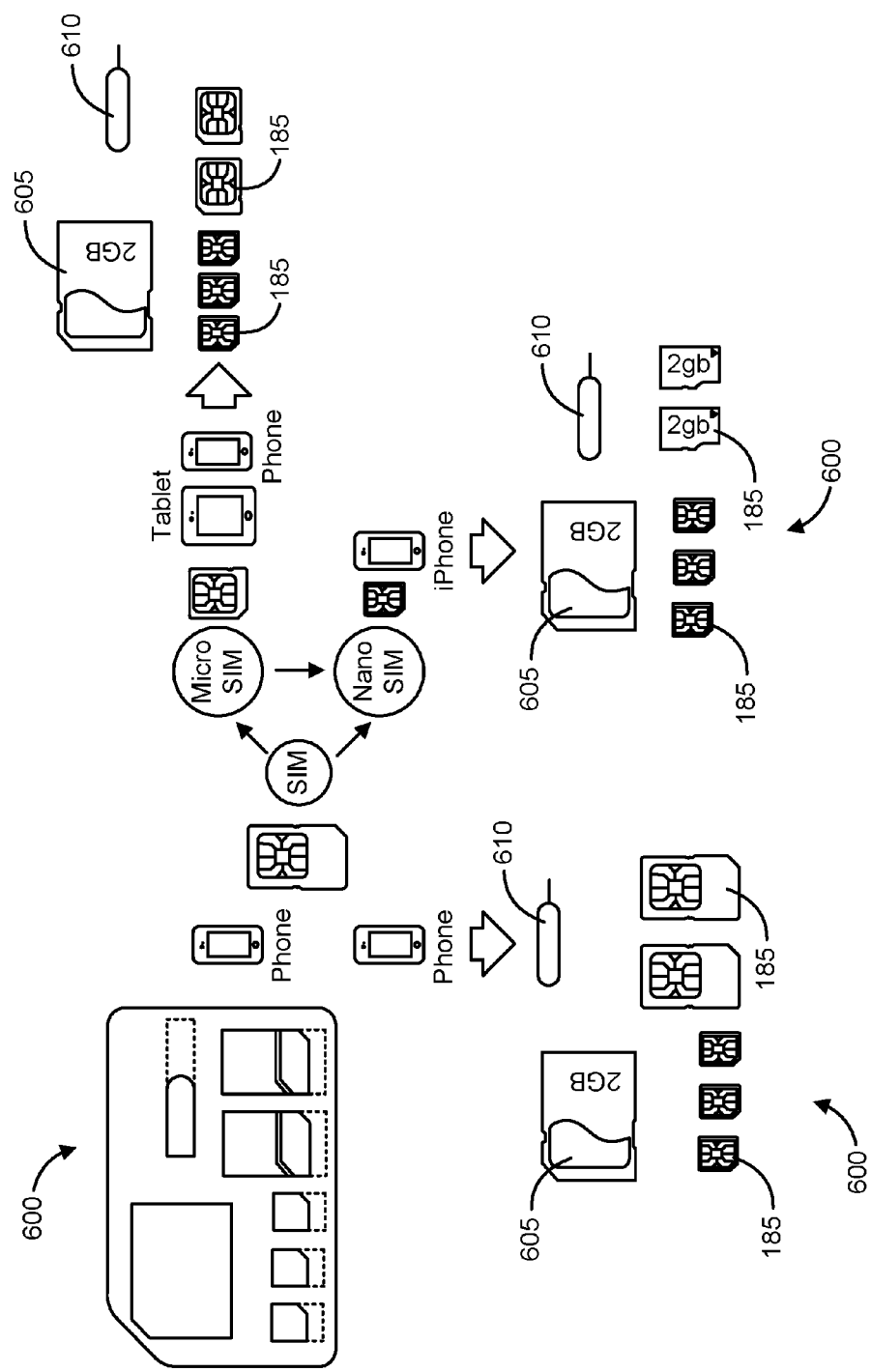

FIG. 19 shows a storage tray that is adapted to receive one or more of a SIM card, micro SIM card, nano SIM card, SD card, and micro SD card.

Figure 20:
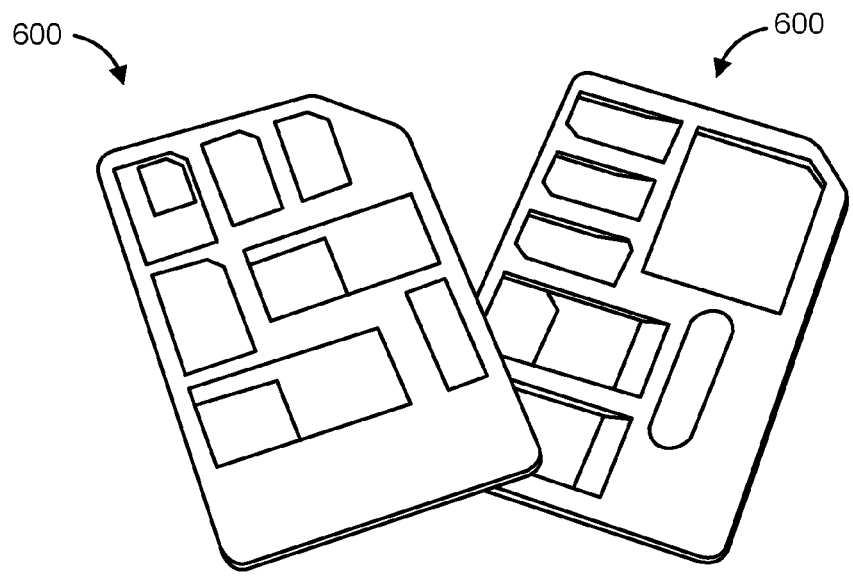

FIG. 20 shows a front perspective view of a storage tray that is adapted to receive one or more of a SIM card, micro SIM card, nano SIM card, SD card, and micro SD card.

Figure 21:
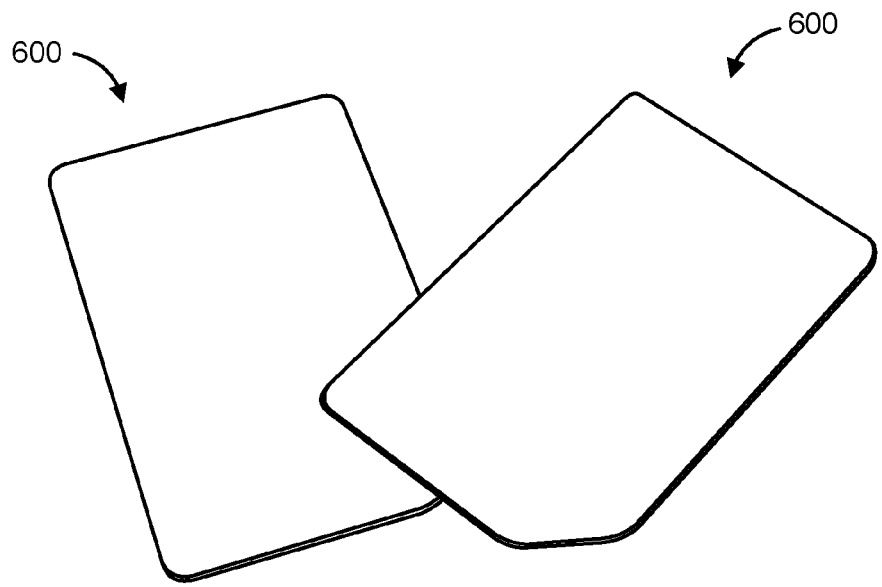

FIG. 21 shows a rear perspective view of a storage tray that is adapted to receive one or more of a SIM card, micro SIM card, nano SIM card, SD card, and micro SD card.

FIG. 22 shows a rear perspective view of a protective case that is adapted to receive and electrically connect one or more SIM cards to a SIM port of an electronic device housed in the protective case.

DETAILED DESCRIPTION

In many instances, it can be desirable to have a protective case 100 that is capable of storing a wide variety of personal items, such as cash, keys, computer memory cards, payment cards (e.g. debit or credit cards), employee badge, and/or a driver's license. The ability to store items in protective case 100 can allow a user to leave their wallet or purse at home when only relatively small items need to be transported. The solutions described herein include a variety of protective cases, each having a compartment for storing items. Unlike conventional wallets, which rely on leather or fabric sleeves to retain a payment or identification card and leave a portion of the card exposed, the solutions described herein do not leave the card exposed whatsoever and thereby provide greater security against theft or loss of the card. Also, the solutions described herein provide far greater protection from damage for stored items than traditional purses and wallets, and in some examples, also provide protection against liquids, dirt, and/or dust by incorporating a sealing compartment. Various examples of protective cases with compartments are presented in the accompanying figures and are described in detail below.

Figure 1:
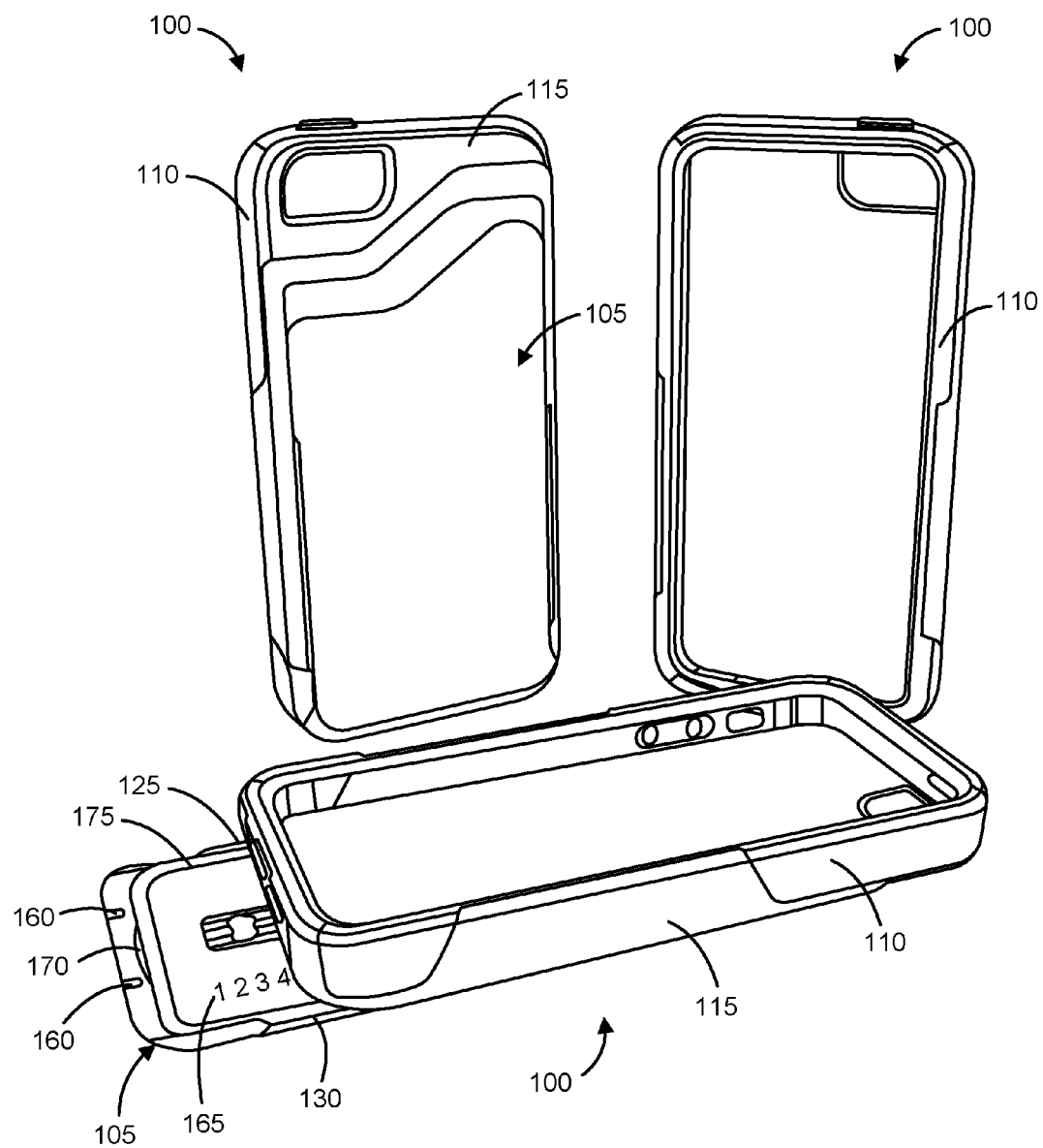
Figure 2:
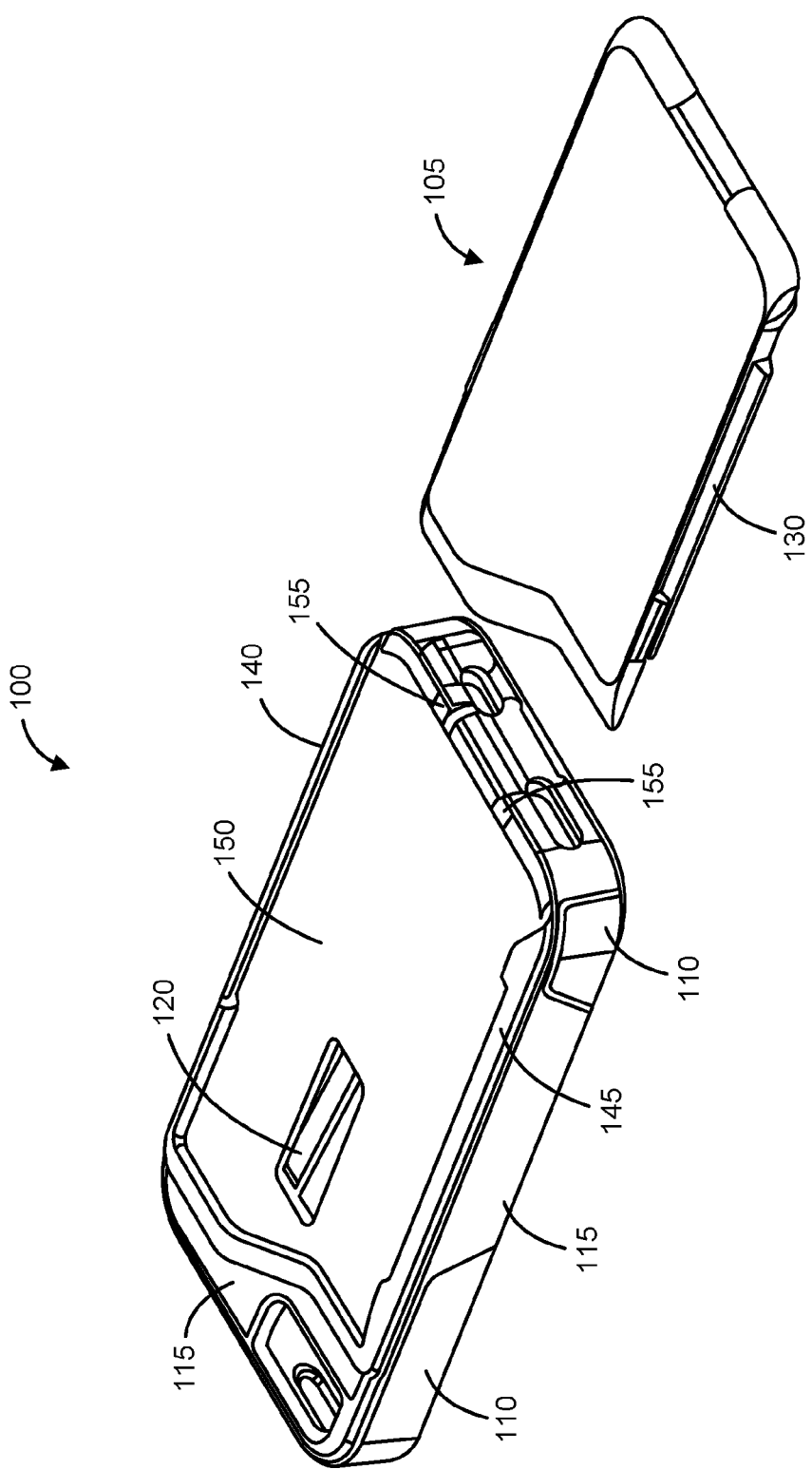
FIG. 2 shows a rear perspective view of the protective case of FIG. 1, where a sliding drawer is completely detached from a back side surface of the protective case.

As shown in FIGS. 1 and 2, a protective case 100 for a personal electronic device can include sliding drawer 105 configured to receive a card 165, such as a payment card or driver's license. The sliding drawer 105 can slidably attach to a back side surface 150, as shown in FIG. 2, of the protective case 100. The card 165 can reside in a compartment located within the protective case. In one example, the compartment can be a volume bounded, in part, by the inner surface of the sliding drawer 105 and the back side surface 150 of the protective case 100. The card 165 can be accessible when the sliding drawer 105 is in an opened position, as shown in the lower view in FIG. 1, and can be completely concealed when the sliding drawer is in a closed position, as shown in the upper left view in FIG. 1. The card 165 can nest inside the sliding drawer 105 such that the card is visible to the user when the sliding drawer is opened and the user is viewing a display screen of the personal electronic device. This configuration can permit the user to retrieve the card 165 from the sliding drawer 105 while holding the electronic device is an orientation that permits the user to continue viewing and interacting with the display screen of the electronic device. In some instances, the user may be submitting payment information through a website accessed with the electronic device. To view a credit card number for entry, the user may simply open the sliding drawer, view the number, and enter the number into a payment filed on the website.

The sliding drawer 105 can have an inner surface 175 that is configured to accommodate a standard card. Specifically, the inner surface 175 of the sliding drawer 105 can define a rectangular cavity having a length of about 3.38 inches and a width of about 2.13 inches. In one instance, the dimensions of the inner surface 175 of the sliding drawer 105 can be slightly larger than the dimensions of a standard card to ease insertion and removal of the card into and from, respectively, the sliding drawer. For instance, the rectangular cavity within the sliding drawer can have a length of about 3.38-3.40, 3.38-3.43, 3.38-3.48, or 3.38-3.58 inches and a width of about 2.13-2.15, 2.13-2.18, 2.13-2.23, or 2.13-2.33 inches The sliding drawer 105 can include a relief 170, as shown in FIG. 1, which can be about the size of a fingertip and can make the card easier to retrieve from the sliding drawer. The relief 170 can be centrally located along the bottom edge of the sliding drawer 105. Alternately, the relief can be located at the left or right side of the bottom edge of the sliding drawer 105 or along the right side edge or left side edge of the sliding drawer.

The sliding drawer 105 can attach to the protective case 100 using a rail system. In one example, as shown in FIGS. 1 and 2, the sliding drawer 105 can include a first rail 125 disposed along a first edge of the sliding drawer and a second rail 130 disposed along a second edge of the sliding drawer, where the first edge of the sliding drawer is opposite the second edge of the sliding drawer. The protective case 100 can include a first rail receiver 140 located proximate a first edge of the back side surface 150 and a second rail receiver 145 located proximate a second edge of the back side surface. The first rail receiver 140 can be configured to receive the first rail 125 on the sliding drawer 105, and the second rail receiver 145 can be configured to receive the second rail 130 on the sliding drawer.

In an alternate configuration, the sliding drawer 105 can include a first rail receiver disposed along a first edge and a second rail receiver disposed along a second edge, where the first edge of the sliding drawer is opposite the second edge of the sliding drawer. The protective case 100 can include a first rail located proximate a first edge of the back side surface 150 of the protective case and a second rail located proximate a second edge of the back side surface. The first rail can be configured to engage the first rail receiver, and where the second rail can be configured to engage the second rail on the sliding drawer when the sliding drawer is attached to the protective case.

The sliding drawer 105 can include one or more detents 160 configured to secure the sliding drawer in a closed position. As shown in FIG. 1, the detents 160 can be raised semi-spherical detents that are configured to engage in correspondingly shaped recesses 155 located on the back side surface 150 of the protective case 100. Although the detents 160 are shown proximate a bottom edge of the sliding drawer 105 in FIG. 1, this is not limiting. The detents 160 can be located in any suitable location. For instance, the detents 160 could be located proximate a top edge of the sliding drawer 105.

As shown in FIGS. 1 and 2, the protective case 100 can include a flexible cushion layer 110 that fits within a cavity of a structural layer 115. The flexible cushion layer 110 can absorb and dissipate impact forces associated with dropping the protective case onto the ground. The flexible cushion layer 110 can cover at least a back surface of the personal electronic device. The flexible cushion layer 110 can also cover a top surface and a bottom surface of the electronic device as well as left side surface and a right side surface of the electronic device. As a result of this surface coverage, the flexible cushion layer 110 can protect the electronic device from scuffs, scratches, or other surface damage.

The flexible cushion layer 110 can be made of any suitable material, such as a saturated or unsaturated elastomer. Examples of suitable materials include, but are not limited to, silicon rubbers and thermoplastic elastomers (TPE), including silicone-based thermoplastics. The flexible cushion layer 110 can have any suitable hardness. In one example, the flexible cushion layer 110 can have a hardness of 30-70, 30-50, or 40-50 Shore A. The flexible cushion layer 110 can be formed through an injection molding process or other suitable manufacturing process. The flexible cushion layer 110 can have a thickness of about 0.005 to 0.25, 0.005 to 0.1, 0.01 to 0.08, 0.01 to 0.06, 0.01 to 0.05, or 0.01 to 0.04 in.

The structural layer 115 can be made from any suitable material such as a thermoplastic polymer. The structural layer 115 can include metal, wood, polycarbonate (PC), nylon, composite (e.g. carbon fiber composite), or glass filled nylon. Alternately, any other material, or combination of materials, that provide suitable rigidity to the protective enclosure 100 can be used in manufacturing the structural layer 115.

The protective case 100 can include a retention spring 120 extending from a back side surface 150 of the protective case 100, as shown in FIG. 2. The retention spring 120 can be configured to provide a spring force against an inner surface 175 of the sliding drawer 105 to resist opening of the sliding drawer when the sliding drawer is in a closed position. The retention spring 120 can include a first end that is attached to the back side surface 150 and a second end that is opposite the first end. The second end of the retention spring 120 can include a detent or other suitable retention feature configured to engage a corresponding retention feature located on an inner surface 175 of the sliding drawer 105. In another example, the retention spring 120 can be configured to provide a spring force against a card 165 located in the sliding drawer 105 compartment, thereby pressing the card against the inner surface 175 of the sliding drawer and preventing the card from rattling within the compartment.

Figure 4:
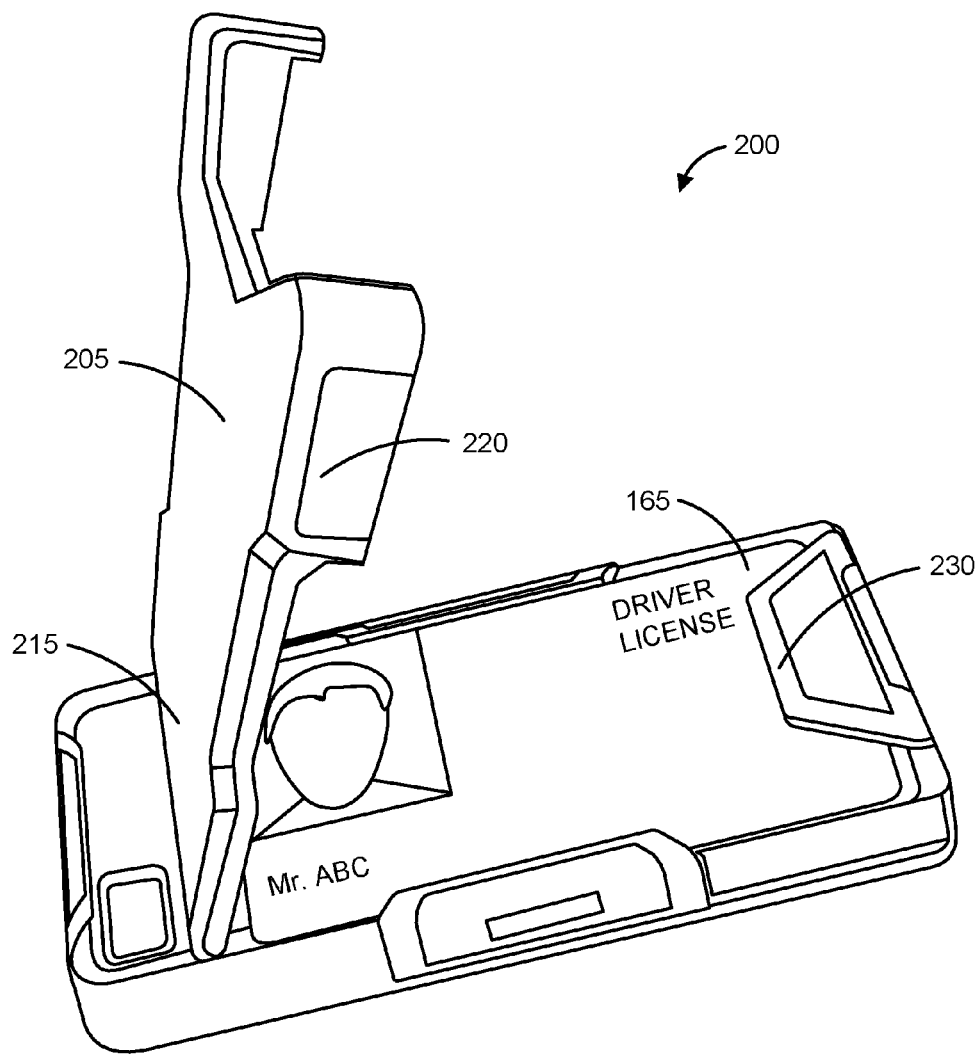
FIG. 4 shows a rear perspective view of the protective case of FIG. 3 with a compartment door in an open position revealing a driver's license stored within the compartment.

As shown in FIGS. 3-5, the protective case 200 can include a compartment door 205 located proximate a back side surface 210 of the protective case. The compartment door 205 can open to permit access to a compartment located within the protective case 200. The compartment can be configured to receive a card 165, as shown in FIG. 4. In another example, the compartment can be configured to receive cash or personal items such as, for example, a key, ring, cosmetics (e.g. powder), tools for cosmetics (e.g. cosmetic brushes), or lip balm. In one example, the protective case 100 can serve as a suitable replacement for a compact and can include a mirror, pressed or loose powder, and a powder application tool, such as a brush or puff. The protective case 100 can include a quantity of cosmetics (e.g. pressed powder) disposed within a cosmetics receptacle, such as a shallow container, formed in the compartment. A cosmetic tool for applying the cosmetics can be removably attached to an inner surface of the compartment. The cosmetic tool can be attached to the inner surface of the compartment with adhesive, hook and loop fastener, snap fit, keeper, or any other suitable method of attachment. In one example, the cosmetic tool can be stored into a long slender opening in the protective case, similar to the way a stylus is stored within certain handheld computers.

A mirror can be attached to an inner surface of the compartment door 215, sliding drawer 105, or to a back side surface 150 of the protective case (e.g. 100, 200). The mirror can be attached with adhesive or any other suitable fastener. The mirror can include a substrate material coated with a reflective material such as, for example, glass coated with a thin layer of silver or aluminum. To provide a durable mirror that can withstand drops without shattering, the mirror can be made of GORILLA GLASS coated with a thin layer of silver or aluminum. In other examples, the mirror can be made of polished metal or metal foil and may not include glass.

The compartment door 205 can be attached to the protective case 200 by a hinge 215. The hinge 215 can be a living hinge. In one example, the living hinge can be made of the same material as the compartment door 205, but can be significantly thinner to permit flexing. In another example, the living hinge can be overmolded onto the compartment door 205 and can include a thermoplastic elastomer.

The compartment door 205 can include a first recess 220 and a second recess 225. The first and second recesses (220, 225) can allow the user to secure an opposable grip on the compartment door 205. Specifically, the user can place a thumb in either the first or second recesses (220, 225) and a forefinger in the remaining recess. By pinching the compartment door 205 at the first and second recesses simultaneously, retention features on the compartment door can release from the back side surface 210 of the protective case 200, thereby permitting the user to open and access the compartment and also providing a multi-step process that prevents inadvertent opening of the compartment.

The protective case 200 can include a card clip 230, as shown in FIG. 4. The card clip 230 can provide a compressive force that presses the card 165 against the back side surface 210 of the protective case 200 when the card is stored in the compartment. The compressive force can prevent the card 165 from falling out of the compartment if the compartment door 205 opens inadvertently. In one example, the card clip 230 can be spring loaded to provide a suitable compressive force against the card 165. In another example, the clearance between the back side surface 210 and an inner surface of the card clip 230 can be sufficiently narrow to provide a suitable compressive force against the card 165. In this example, the clearance between the back side surface 210 and an inner surface of the card clip 230 may be less than the thickness of the card 165, and the card clip may deflect outwardly slightly to accommodate the card.

As shown in FIGS. 6-9, the protective case 300 can include a first slot 305 that serves as a compartment for storing a first card 165. The protective case 300 can include an ejection mechanism disposed within the protective case 300. The ejection mechanism can be connected to a dial 315. Rotation of the dial 315 in a first direction can cause the ejection mechanism to eject the first card 165 from the first slot 305 entirely. Alternately, rotation of the dial 315 in a first direction can cause the ejection mechanism to eject at least a portion of the first card 165 from the first slot 305, as shown in FIG. 6. For instance, rotation of the dial 315 in a first direction can cause about 1-5%, 5-15%, 15-30%, 30-50%, or 50-75% of the first card 165 to be ejected from the first slot 305, which can permit the user to easily grasp and withdraw the first card form the first slot.

The protective case 300 can include a second slot 310 that serves as a compartment for storing a second card 165. Rotation of the dial 315 in a second direction, opposite the first direction, can cause the ejection mechanism to eject the second card 165 from the second slot entirely. Alternately, rotation of the dial 315 in a second direction, opposite the first direction, can cause the ejection mechanism to eject at least a portion of the second card 165 from the second slot 310, as shown in FIG. 7A. For instance, rotation of the dial 315 in a second direction can cause about 1-5%, 5-15%, 15-30%, 30-50, or 50-75% of the second card 165 to be ejected from the second slot 310, which can permit the user to easily grasp and withdraw the card from the second slot.

FIG. 8 shows a side cross-sectional view of the protective case 300 of FIG. 6 taken along section A-A. FIG. 9 shows a rear cross-sectional view of the protective case 300 of FIG. 6. The first and second slots (305, 310) can be arranged in a stacked configuration. In one example, the first slot 305 can be positioned between the back side surface 325 and the second slot 310, as shown in FIG. 8. In another example, the second slot 310 can be positioned between the back side surface 325 and the first slot 305. To maintain a thin protective case, the first and second slots (305, 310) can be separated by a thin divider.

The ejection mechanism can include any suitable mechanical components to convert rotational motion from the dial 315 into translational motion required to eject the card from the slot (e.g. 305, 310). In one example, shown in FIGS. 8 and 9, the ejection mechanism can include a rack and pinion system configured to convert rotational motion from the dial 315 into translational motion required to eject the card 165 from the slot (e.g. 305, 310). The dial 315 can include a first gear configured to engage a second gear 340, as shown in FIG. 8. The second gear 340 can be attached to a shaft that extends downward from the second gear and through the first and second slots (305, 310). The shaft can include a first pinion 345 configured to engage a first rack 330 disposed in the first slot 305, as shown in FIG. 9. The shaft can also include a second pinion 350 configured to engage a second rack 335 disposed in the second slot 310, as shown in FIG. 10. The first rack 330 can include a finger portion that engages a side edge of the card 165. In the example shown in FIG. 9, rotation of the first pinion 345 in a clockwise direction will cause the first rack 330 to travel leftward, causing the finger portion to apply a force against the side of the card 165, thereby causing at least a portion of the card to eject from the first slot 305.

The ejection mechanism can include a clutch or other suitable mechanism to prevent the first card from being ejected when the user rotates the dial 315 to eject the second card. For instance, the ejection mechanism can include a first clutch located between the shaft and the first pinion 345. The first clutch can disengage when the shaft is rotated in a first direction, resulting in the first pinion 345 remaining stationary and the first card 165 remaining in the first slot 305. Likewise, the ejection mechanism can include a clutch or other suitable mechanism to prevent the second card from being ejected when the user rotates the dial 315 to eject the first card. For instance, the ejection mechanism can include a second clutch located between the shaft and the second pinion 350. The second clutch can disengage when the shaft is rotated in a second direction, resulting in the second pinion 350 remaining stationary and the second card remaining in the second slot 310.

To prevent the cards from inadvertently exiting the slots (305, 310) during everyday use, each slot can be sized to provide a slight interference fit between the card and interior surfaces of the slot. In one example, the interior surface of the slot can be covered with a soft material or fabric, which can deflect as the card is inserted into the slot. During the ejection process, the ejection mechanism can apply sufficient force to the card to overcome resistance created by the interference fit.

Although a rack and pinion system is shown and described in detail, this does not limit the ejection mechanism. In another example, the ejection mechanism can include a pulley and sprocket system. In yet another example, the ejection mechanism can include a screw system that converts rotational motion to translational motion.

As shown in FIG. 7B, the protective case 400 can include an ejection mechanism that employs a slider. The slider 410 can include a catch configured to engage a side edge of the card 165 and push the card out of the slot 405 when the slider is actuated. Although only one slot 405 is shown, the protective case 400 can include a second slot configured to receive a second card.

As shown in FIG. 7C, the protective case 500 can include a slot 505 configured to receive a card 165. The ejection mechanism can include a dial 515 with a raised portion 520. The raised portion 520 can make the dial easier to grasp and rotate, which can be desirable for certain users, such as those suffering from arthritis in their fingers. Although only one slot 505 is shown, the protective case 500 can include a second slot configured to receive a second card.

In one example, a protective case for a personal electronic device can include a sliding drawer configured to receive a card, where the sliding drawer is slidably attached to a back side surface of the protective case, where the card is accessible when the sliding drawer is in an opened position, and where the card is completely concealed when the sliding drawer is in a closed position. The protective case can include a retention spring extending from a back side surface of the protective case. The retention spring can be configured to provide a spring force against an inner surface of the sliding drawer to resist opening of the sliding drawer when the sliding drawer is in a closed position. The retention spring can be configured to press the card against the inner surface of the sliding drawer and prevent the card from rattling within the sliding drawer when the sliding drawer is in a closed position. The sliding drawer can include one or more detents configured to secure the sliding drawer in a closed position. The protective case can include a structural layer comprising a cavity, and a flexible cushion layer configured to cover at least a back surface of the personal electronic device and fit within the cavity of the structural layer.

In one configuration, the sliding drawer can include a first rail disposed along a first edge and a second rail disposed along a second edge, where the first edge of the sliding drawer is opposite the second edge of the sliding drawer, where the protective case includes a first rail receiver located proximate a first edge of the back side surface and a second rail receiver located proximate a second edge of the back side surface, where the first rail receiver is configured to receive the first rail on the sliding drawer, and where the second rail receiver is configured to receive the second rail on the sliding drawer.

In another configuration, the sliding drawer can include a first rail receiver disposed along a first edge and a second rail receiver disposed along a second edge, where the first edge of the sliding drawer is opposite the second edge of the sliding drawer, where the protective case includes a first rail located proximate a first edge of the back side surface and a second rail located proximate a second edge of the back side surface, where the first rail is configured to engage the first rail receiver, and where the second rail is configured to engage the second rail on the sliding drawer when the sliding drawer is attached to the protective case.

The sliding drawer can include an inner surface having a rectangular cavity configured to receive a card, where the rectangular cavity has a length of about 3.38-3.48 inches and a width of about 2.13-2.23 inches. The card can be a payment card or a driver's license.

A protective case for a personal electronic device can include a compartment door located proximate a back side surface of the protective case, a hinge attaching the compartment door to the back side surface of the protective case, and a compartment defined by a volume located between the compartment door and the back side surface of the protective case, where the compartment is configured to receive a card, where the card is accessible when the compartment door is in an opened position, and where the card is completely concealed when the compartment door is in a closed position. The hinge can be a living hinge and can be made of a thermoplastic elastomer. The protective case can include a card clip extending from the back side surface of the protective case and configured to provide a compressive force against the card when the card is inserted between the back side surface of the protective case and an inner surface of the card clip. The card clip can be spring loaded.

A protective case for a personal electronic device can include a first slot configured to receive a first card, and an ejection mechanism connected to a dial, where rotation of the dial in a first direction causes the ejection mechanism to eject at least a portion of the first card from the first slot. The protective case can also include a second slot configured to receive a second card, where rotation of the dial in a second direction opposite the first direction causes the ejection mechanism to eject at least a portion of the second card from the second slot. The first card can be a payment card, and the second card can be a driver's license.

A subscriber identity module (SIM) is an integrated circuit that securely stores the international mobile subscriber identity (IMSI) and related key used to identify and authenticate a subscriber on a mobile telephony device, such as mobile phone or computer. A SIM integrated circuit can be embedded into a removable plastic card called a "SIM card," which can be transferred between different mobile devices. Each SIM card can contain one or more of the following features: a unique integrated circuit card identifier (ICCID), international mobile subscriber identity (IMSI), security authentication and ciphering information, temporary information related to a local network, a list of services a user has access to, a password for a personal identification number (PIN) for ordinary use, and a personal unblocking code (PUK) for PIN unlocking. SIM cards are available in several sizes, including full-size and mini, micro, and nano sizes.

When traveling from a first country to a second country, a user may need to remove a first SIM card from the electronic device and replace it with a second SIM card to permit the user to access a network in the second country. The second SIM card can also permit the user to have a local telephone number in the second country, which may be desirable for certain business reasons and for reducing call costs (e.g. by avoiding roaming costs). When the user removes the first SIM card, the user must find a safe place to store the first SIM card. Due to their small size, it is relatively easy to misplace or lose a SIM card, and due to their fragile nature, it is relatively easy to damage a SIM card if not stored carefully. To avoid this type of loss or damage, it can be desirable to have a convenient place to store a SIM card immediately after it is removed from the electronic device. In certain instances, a protective case for an electronic device can be adapted to store and protect one or more SIM cards.

FIG. 10 shows a front perspective view of a protective case 100 for an electronic device such as, for example, a smartphone or computer. The protective case 100 can include a sliding drawer 105, which is shown in an opened position revealing locations for a credit card, driver's license, cash, and one or more SIM cards 185. The sliding drawer 105 can include one or more partitions 180 that subdivide the inner surface 175 of the sliding drawer 105 to accommodate one or more of the items mentioned above. In one example, the sliding drawer 105 can include partitions 180 arranged to provide snap in locations for one or more SIM cards 185. Alternately, the inner surface 175 of the sliding drawer 105 can include any suitable feature or mechanism to retain each SIM card 185 and prevent each SIM card from moving around within the compartment or potentially falling out of the compartment when the sliding drawer 105 is opened.

FIG. 11 shows a rear perspective view of a protective case 100 for an electronic device such as, for example, a smartphone or computer. The protective case 100 can include sliding drawer 105, which is shown in an opened position revealing one or more SIM cards 185 disposed within an opening in a back side surface 150 of the protective case 100. The opening 186 can be adapted to receive one or more SIM cards 185. As shown in FIG. 11, the opening (or pocket) 186 can pass through a structural layer 115 of the protective case 100 and thereby allow one or more SIM cards to rest against the flexible cushion layer 110, which may help to protect the SIM cards from drop-induced damage. This configuration may also provide more room inside the sliding drawer for storing items such as credit cards, cash, or keys.

FIG. 12 shows a front view of a SIM card storage tray 190 positioned beside a front perspective view of a protective case 100 with a compartment in an opened position revealing a removable SIM card storage tray. The SIM card storage tray 190 can include one or more storage slots 195 adapted to receive one or more SIM cards 185. In one instance, a SIM card 185 can slide into a storage slot 195 and be held in place by a friction fit. The SIM card storage unit 190 can be adapted to fit within a compartment in the protective case 100. For instance, the SIM card storage tray 190 can have a length and width that are similar to a credit card 165, but the SIM card storage tray 190 may be thicker than a credit card 165 to accommodate and protect the one or more SIM cards 185.

The SIM card storage tray 190 can be removable from the protective case 100. A user may choose to keep the SIM card storage unit 190 in the sliding drawer 105 when traveling internationally to provide quick access to the one or more SIM cards stored therein, but the user may choose to remove the SIM card storage unit 190 from the sliding drawer when not traveling and not frequently changing SIM cards. The removable SIM storage tray 190 can protect the one or more SIM cards from damage and can be stored, for example, in a suitcase or dresser drawer when not stored in the protective case 100. Removing the storage unit 190 from the compartment can free up space for cards, cash, or personal items. Consequently, having a removable SIM card storage tray 190 can increase the functionality of the protective case 100 by allowing the carrying capacity of the protective case to be modified depending on whether or not frequent changing of SIM cards is anticipated.

In one example, a protective case 100 for a personal electronic device can include a sliding drawer adapted to receive a SIM card storage tray 190, as shown in FIG. 12. The SIM card storage tray 190 can include one or more storage slots 195 each adapted to receive a SIM card. The sliding drawer 105 can be slidably attached to a back side surface of the protective case 100. The SIM card storage tray 190 can be accessible when the sliding drawer 105 is in an open position, and the SIM card storage tray can be concealed when the sliding drawer is in a closed position.

FIG. 13 shows several views of a protective case 100 with a sliding drawer 105. The rightmost view shows the sliding drawer 105 in an opened position revealing three SIM cards 185 separated by partitions 180. The partitions 180 can allow the SIM cards to be snapped into place for storage and protection. The partitions 180 can provide a friction fit that suitably retains each SIM card in place, but also permits each SIM card to be removed relatively easily with a finger or a removal tool. For instance, at least one corner of each SIM card may be exposed, as shown in FIG. 13, thereby permitting a user to free each SIM card using a finger.

FIG. 14 shows several views of a protective case 100 that is adapted to store one or more SIM cards 185. The SIM cards 185 can be stored within the protective case 100 behind the electronic device. The inside surface of the protective case 100 can include one or more openings each adapted to receive a SIM card 185. As shown in FIG. 13, the protective case 100 can include three openings each adapted to receive a SIM card 185. The openings can be formed in the flexible cushion layer 110. Each opening can be slightly smaller than the outer dimensions of the SIM card, thereby permitting the SIM card to be pressed into the opening and be retained by friction.

FIG. 15 shows a front and rear perspective view of a protective case 100 for an electronic device. The protective case 100 is adapted to receive and store one or more SIM cards 185. Specifically, the protective case 100 can include one or more storage slots 187 that are adapted to each receive a SIM card 185. The one or more storage slots 187 can be formed in the structural layer 115 of the protective case 100. In one example, each storage slot 187 can provide a friction fit that is suitable to retain each SIM card. In another example, each storage slot 187 can include a spring-loaded mechanism, which can be any of the various types of spring-loaded mechanisms commonly used in flash and SD card slots in digital cameras and portable computers.

Removing the electronic device from the protective case 100 exposes the device to potential damage from, for example, drops. Therefore, it can be desirable to change the SIM card 185 in the electronic device without removing the electronic device from the protective case 100. To accomplish this, the protective case 100 can provide access to the SIM card slot in the electronic device. For example, as shown in FIG. 15, the protective case 100 can include an access flap 188 that allows a user to exchange the SIM card without removing the protective case. The access flap 188 can be formed in the flexible cushion layer 110 of the protective case 100 and can be attached to the flexible cushion layer by, for example, a living hinge.

As shown in FIG. 16, the protective case 100 can include a sliding drawer or door 105 that is adapted to receive one or more SIM cards 185. The sliding drawer 105 can include one or more storage slots 187 each adapted to receive a SIM card 185. Each SIM card 185 can slide into a corresponding storage slot 187 located on the inner surface 175 of the sliding drawer 105. When a SIM card 185 is installed in the storage slot 187, a slight interference fit may be provided between opposing storage slot rails and the SIM card to ensure the SIM card does not unwantedly exit the storage slot and bounce around within the compartment where it might suffer damage under certain conditions. The rails of the storage slot can be formed by suitable manufacturing process, such as an injection molding process.

A storage card 600 is shown in FIG. 17. The storage card 600 can be adapted to receive and store a variety of items, such as a SIM card 185, a removable memory card 605 (e.g. secure digital memory card), or a SIM eject tool 610 (e.g. paper clip). The storage card 600 can have a similar length and width as a credit card and can fit within a storage compartment of a protective case 100. FIGS. 18 and 19 show a variety of configurations of SIM cards 185, removable memory cards 605, and SIM eject tools 610 attached to various storage cards 600. FIG. 20 shows a front perspective view of two storage cards 600, and FIG. 21 shows a rear perspective view of two storage cards. The front surface of the storage cards 600 may include one or more pockets adapted to receive one or more types of SIM cards, removable memory cards, or tools (e.g. SIM eject tools).

FIG. 22 shows a protective case 100 adapted to receive one or more SIM cards 185. To avoid the step of physically exchanging SIM cards, the protective case 100 can include one or more SIM cards 185 that are electrically connected to a SIM port on the electronic device. A user can select from among the one or more SIM cards 185 using a selector switch 615 located on an outer surface of the protective case 100. For instance, when the user is travels from a first country to a second country, the user can use the selector switch to electrically connect a SIM card that is compatible with a network in the second country to the SIM port on the electrical device. This allows the user to easily select a SIM card without needing to remove the electronic device from the case and physically exchange the SIM cards.

In one example, a protective case 100 for a personal electronic device can include one or more storage slots each adapted to receive a unique SIM card 185. The one or more storage slots can each be electrically connected to a selector switch 615 that allows a user to manually select which SIM card should be electrically connected to the electronic device housed within the protective case (see, e.g., FIG. 22). This feature allows a user to travel between countries and, instead of having to manually remove and replace the SIM card during each journey, the user can simply use the selector switch 615 to choose the appropriate SIM card depending on location.

In one example, a protective case 100 for a personal electronic device can include a first slot 305 configured to receive a first card, such as a payment card (e.g. credit, debit, or gift card) or identification card (e.g. student identification card, driver's license, employee badge, medical insurance card, or Social Security card). The protective case 100 can include an ejection mechanism connected to a dial (see, e.g. FIG. 7), where rotation of the dial in a first direction causes the ejection mechanism to eject at least a portion of the first card from the first slot 305, thereby permitting a user to easily retrieve the first card form the first slot. In some examples, the protective case 100 can also include a second slot 310 configured to receive a second card, where rotation of the dial in a second direction opposite the first direction causes the ejection mechanism to eject at least a portion of the second card from the second slot, thereby allowing a user to easily retrieve the second card from the second slot. In some instances, the dial can include a finger recess to enhance ease of use of use.

A protective case 100 for a personal electronic device can include a sliding drawer 105 comprising an inner surface having a rectangular cavity configured to receive a credit or identification card 165. The rectangular cavity can have a length of about 3.38-3.48 inches and a width of about 2.13-2.23 inches. The sliding drawer 105 can be slidably attached to a back side surface 150 of the protective case 100. The credit or identification card 165 can be accessible when the sliding drawer 105 is in an open position, and the credit or identification card can be concealed when the sliding drawer is in a closed position. The protective case 100 can include a compartment gasket disposed in a gasket channel that extends around the perimeter of the back side surface of the protective case. The compartment gasket is configured to provide a watertight seal against a sealing surface of the sliding drawer 105 when the sliding drawer is in a closed position.

The protective case 100 can include a retention spring 120 extending from a back side surface 150 of the protective case 100. The retention spring 120 can be configured to press the card 165 against an inner surface of the sliding drawer and prevent the card from rattling within the sliding drawer when the sliding drawer is in a closed position. The retention spring can be configured to provide a spring force against an inner surface of the sliding drawer 105 to resist opening of the sliding drawer when the sliding drawer is in a closed position.

In some examples, the protective case 100 can include a mirror that is adhered to or formed on an inner surface of the sliding drawer 105, the mirror being visible when the sliding drawer is in an open position and being concealed when the sliding drawer is in a closed position.

In some examples, the sliding drawer 105 can include a first rail disposed along a first edge and a second rail disposed along a second edge, where the first edge of the sliding drawer is opposite the second edge of the sliding drawer. The protective case 100 can include a first rail receiver located proximate a first edge of the back side surface and a second rail receiver located proximate a second edge of the back side surface. The first rail receiver can be configured to receive the first rail on the sliding drawer, and the second rail receiver is configured to receive the second rail on the sliding drawer to effectively couple the sliding drawer 105 to the back side surface 150 of the protective case 100.

In other examples, the sliding drawer 105 can include a first rail receiver disposed along a first edge and a second rail receiver disposed along a second edge, where the first edge of the sliding drawer is opposite the second edge of the sliding drawer. The protective case 100 can include a first rail located proximate a first edge of the back side surface and a second rail located proximate a second edge of the back side surface. The first rail can be configured to engage the first rail receiver, and the second rail can be configured to engage the second rail on the sliding drawer to effectively couple the sliding drawer 105 to the back side surface 150 of the protective case 100.

In some examples, the compartment can be a liquid-tight compartment that prevents water-sensitive items stored in the compartment from being damaged if the protective case (e.g. 100, 200) is submersed in water or is exposed to precipitation. In some examples, a waterproof compartment can be combined with any of the waterproof protective cases ("housings") that are described in U.S. patent application Ser. No. 14/029,739, filed on Sep. 17, 2013, which is hereby incorporated by reference in its entirety. Specifically, as shown in FIGS. 1A and 1B of U.S. patent application Ser. No. 14/029,739, a housing 1 for an electronic device can include a top member 2 having a perimeter portion forming a proximal end portion, a distal end portion, and opposing side portions. The top member 2 can include a front surface 25a and a back surface 25b spanning from the proximal end portion to the distal end portion and across the opposing side portions of the top member. The housing 1 can also include a bottom member 3 that is configured to couple with the perimeter portion of the top member 2. The bottom member 3 of the housing 1 can include a front surface, a back surface, and a side wall that extends around at least a portion of a perimeter of the bottom member. The side wall of the bottom member 3 can include an inner surface and an outer surface. The perimeter portion of the bottom member 3 can include a channel 10 and a gasket 15, such as a compressible O-ring, positioned at least partially therein, as shown in FIG. 3A of U.S. patent application Ser. No. 14/029,739. The top member can have a flexible overmold and a first clasping mechanism 27 that runs along a portion or the entire perimeter of the top and/or bottom member.

As can be seen with respect to FIG. 3A, the front 25 and back 35 surfaces of the top 2 and bottom 3 members of the housing 1 include a perimeter portion 20 and 30, respectively. As depicted, the top member 2 includes a perimeter portion 20. The perimeter portion 20 can include an interior perimeter portion 20a and an exterior perimeter portion 20b. The interior perimeter portion 20a can be made of a rigid material, such as a polycarbonate material or other polymer material, and can be configured for associating with an enclosed device so as to secure the device within the housing 1 and to dampen the transference of shock from the outer side of the housing to the interior of the housing. The exterior perimeter portion 20b can be composed of a flexible material, such as a thermoplastic elastomer (TPE), and can be positioned above and along a side of the interior perimeter portion 20a. The outer perimeter portion 20b may function to reduce the magnitude of a shock force resulting from an impact.

As can be seen with respect to embodiments shown in FIGS. 2D, 3A, and 3D in U.S. patent application Ser. No. 14/029,739, the top member 2 can include a first clasping mechanism 27, and the bottom member 3 can include a second clasping mechanism 37. The first and second clasping mechanisms (27, 37) can extend along the respective perimeters of the top and bottom housings (2, 3). During assembly of the housing 1, the first and second clasping mechanisms 27, 37 can be configured to engage one another in such a manner so as to couple the top 2 and bottom 3 members of the housing 1 together to form a waterproof housing.

The second clasping mechanism 37 of the bottom member 3 can interface with the first clasping mechanism 27 of the top member 2 to maintain the top member and the bottom member coupled together to form a waterproof housing 1. The waterproof housing 1 can also include a waterproof compartment that includes either a compartment door 205 or a sliding drawer 105 as described herein. A compartment gasket (similar to the gasket 15 shown in FIG. 3A of U.S. patent application Ser. No. 14/029,739) can be formed around a perimeter of the sliding drawer 105 or the compartment door 205, and the compartment gasket can be configured to provide a watertight seal against a rear surface of the protective case when the waterproof compartment is closed. Either a dynamic member (e.g. door or drawer) or a stationary member (e.g. protective case body) can contain a compartment gasket. In some examples, the compartment gasket may be positioned in a gasket channel located proximate the perimeter of the sliding drawer 105 or compartment door 205. In other examples, the compartment gasket may be positioned in a gasket channel located on a rear surface of the protective case (e.g. 100, 200). In some examples, the opposed member that does not include a gasket channel may have an impinging member that extends downwards from an interior surface of a perimeter member. The impinging member can be insertable into the gasket channel to compress against the compartment gasket when the top and bottom members are coupled together so as to seal the interface there between. In various embodiments, a gasket channel need not be included. Rather, the top or bottom member may be coated with a sealing member, and the impinging member on the opposed surface of the top or bottom member interacts directly with the sealing member to seal the interface. A clasping mechanism, such as an internal or external clasping mechanism, for instance, a circumferential clasping mechanism, e.g., within the channel, may be included, to secure the top member against the bottom member and thereby further seal the interface between the two.

Many electronic devices include an interactive touch screen made from, in part, sheet toughened glass and an array of touch sensors (e.g. capacitive or inductive touch sensors). Many users prefer the feel of making direct contact with their finger to the touch screen surface as opposed to making direct contact with a transparent polymer sheet that covers the touch screen surface. To eliminate the need for a polymer screen cover disposed over the device's touch screen to achieve a waterproof case, the protective case (e.g. 100, 200) can instead include a top member gasket 15a that is configured to seal against a perimeter of a front surface of the electronic device, as shown and described in U.S. patent application Ser. No. 13/517,583, filed Jun. 13, 2012, which is hereby incorporated by reference in its entirety. The top member gasket 15a can be positioned within a top member channel 10a and can function such that as the top member 2 is installed on an electronic device, the top member gasket 15a contacts a surface of an electronic device, such as a top surface of the touch screen, and is thereby compressed against the surface of the electronic device forming a seal therewith. The seal is further secured by the top member 2 being coupled to the bottom member 3 so as to form the housing 1. The seal generated by the coupling of the top member 2 with the electronic device and/or the further coupling of the top member 2 with the bottom member 3 is a secure, substantially waterproof and/or water resistant and/or substantially shockproof and/or substantially shock resistant seal between the member 2 and the top surface of the electronic device, such as a top surface of a touch-sensitive display.

Any of the waterproof protective cases (housings) described in U.S. patent application Ser. No. 13/517,583 can be combined with a waterproof compartment as described herein to provide a fully waterproof protective case (e.g. 100, 200) that includes a waterproof storage compartment, and permits direct interaction with the electronic device's touch screen. The waterproof compartment can include either a compartment door 205 as shown in FIGS. 3-5, or a sliding drawer 105, as shown in FIGS. 1 and 2. A compartment gasket (similar to the gasket 15 shown in FIG. 3A of U.S. patent application Ser. No. 14/029,739 or similar to the gasket 15a shown in FIGS. 4C-4J of U.S. patent application Ser. No. 13/517,583) can be formed around a perimeter of the sliding drawer 105 or the compartment door 205 or around a perimeter of the back surface of the bottom member 3. The compartment gasket can be configured to provide a watertight seal between the sliding drawer 105 (or compartment door 205 in other examples) and the rear surface of the housing 1 when the waterproof compartment is in a closed position. Either a dynamic member (e.g. door or drawer) or the stationary member (e.g. protective case body) can contain a compartment gasket. In some examples, the compartment gasket may be positioned in a gasket channel located proximate the perimeter of the sliding drawer 105 or compartment door 205. In other examples, the compartment gasket may be positioned in a gasket channel located on a back surface of the bottom member 3 of the housing (e.g. 100, 200). In some examples, the opposed member that does not include a gasket channel may have an impinging member that extends downwards from an interior surface of a perimeter member. The impinging member can be insertable into the gasket channel to compress against the compartment gasket when the top and bottom members are coupled together so as to seal the interface there between. In some embodiments, a gasket channel need not be included. Rather, the top or bottom member (2, 3) may include a sealing member (e.g. an overmolded gasket or a form-in-place gasket), and the impinging member on the opposed surface of the top or bottom member can interact directly with the sealing member to seal the interface. A clasping mechanism, such as an internal or external clasping mechanism (e.g. a circumferential clasping mechanism) may be included, to secure the top member against the bottom member and thereby further seal an interface between the two members to form a liquid-tight housing.

In examples shown in U.S. patent application Ser. No. 14/029,739, a waterproof housing 1 for a personal electronic device can include a top member 2 having a perimeter portion forming a proximal end portion, a distal end portion, and opposing side portions. The top member 2 can include a first clasping mechanism 27 extending around at least a portion of the perimeter portion of the top member. The housing 1 can include a bottom member 3 having a perimeter portion forming a proximal end portion, a distal end portion, and opposing side portions. The bottom member 3 can have a front surface and a back surface spanning from the proximal end portion to the distal end portion and spanning across the opposing side portions of the bottom member. The bottom member 3 can include second clasping mechanism 37 extending around at least a portion of the perimeter portion of the bottom member. The housing can include a gasket (e.g. 15) positioned in a channel (e.g. 10) located in the perimeter portion of the bottom member 3. The perimeter portion of the top member 2 can be configured to press against and compress the gasket in the gasket channel when the first clasping mechanism 27 engages the second clasping mechanism 37 when top member 2 is coupled to the bottom member 3 to form the waterproof housing 1. The waterproof housing (e.g. 1, 100, 200) can also include a waterproof compartment proximate a back surface of the bottom member 3. The waterproof compartment can be defined by a volume located between an inner surface of a compartment door 205 or sliding drawer 105 and the back surface of the bottom member 3. The waterproof compartment can be configured to store one or more items other than the personal electronic device (e.g. payment card, identification card, SIM card, memory card, keys, cosmetics, or cash). The one or more stored items can be accessible when the compartment door 205 or sliding drawer 105 is in an open position, and the one or more stored items can be concealed when the compartment door or drawer is in a closed position.

In examples shown in U.S. patent application Ser. No. 13/517,583, the waterproof housing 1 can further include a top member gasket 15a extending from an inner perimeter portion of the top member 2. The top member gasket 15a can be configured to contact and compress against a top surface of the personal electronic device to form a liquid-tight seal therewith when the personal electronic device is installed in the top member 2 and when the top member is coupled to the bottom member 3 to form the waterproof housing 1.

In some examples, the waterproof compartment 1 can include a slot formed on an inner surface of the sliding drawer 105 (see, e.g. FIGS. 10, 13, and 16) or formed on an inner surface of the compartment door 205, depending on the configuration and functionality of the protective case.

The slot can receive and retain a SIM card, computer memory card, payment card, or identification card.

In some examples, the waterproof case or housing (1, 100, 200) can include a mirror attached to or formed on an inner surface of the compartment door 205 or sliding drawer 105 or attached to a back side surface of the protective case. The housing can also include a quantity of cosmetics disposed within a shallow receptacle formed in an inner surface of the waterproof compartment. In some instances, a cosmetic tool for applying the quantity of cosmetics can be removably attached to the inner surface of the waterproof compartment.

The compartment can provide enhanced security for stored payment cards. In some examples, the compartment can include a shielding material that protects any payment cards having magnetic strips or electronic components from being damaged or interfered with by magnetic fields originating outside of the compartment or protective case. The magnetic shielding can also protect any payment cards having magnetic strips or electronic components from being damaged or interfered with by magnetic fields produced by the personal electronic device housed in the protective case or housing (e.g. 1, 100, 200). In some instances, the shielding material can cover all internal surfaces of the compartment and can include, for example, a thin layer of metal foil, magnetic shielding polyester (PET) film, metalized fabric, metalized glass fiber (MGF), or a thin layer of metallic paint. In some instances, the shielding material can be integrated or mixed into the material used to form the compartment door 205 or sliding drawer 105 of the compartment and, therefore, may not be a separate component from the door or drawer. When a payment card or electronic component is stored within the closed compartment, the shielding material can prevent information that is stored within or on any payment card or electronic component (e.g. RFID chip) from being inadvertently or maliciously read by a wireless card reader. This security feature can prevent a user's payment card information from being acquired by another person unbeknownst to the user. This feature can also prevent a mobile point of sale from inadvertently acquiring the user's payment card information as a result of the user's payment card being in close proximity to the mobile point of sale even though the user has not initiated or approved a commercial transaction.

The foregoing description has been presented for purposes of illustration and description. It is not intended to be exhaustive or to limit the claims to the embodiments disclosed. Other modifications and variations may be possible in view of the above teachings. The embodiments were chosen and described to explain the principles of the invention and its practical application to enable others skilled in the art to best utilize the invention in various embodiments and various modifications as are suited to the particular use contemplated. It is intended that the claims be construed to include other alternative embodiments of the invention except insofar as limited by the prior art.

What is claimed is:

1. A protective case for an electronic device, the case comprising:
   a cushion layer configured to cover a back surface, a left side surface, a right side surface, a top side surface, and a bottom side surface of the electronic device;
   a structural layer having a back portion and at least two side walls connected to and extending from the back portion, the structural layer configured to surround the cushion layer when the electronic device is installed in the protective case;
   a sliding drawer attached to an outer surface of the back portion of the structural layer, the sliding drawer having a drawer cavity defined by the outer surface of the back portion of the structural layer and an inner surface of the sliding drawer, the sliding drawer configured to store one or more items, wherein the one or more stored items are accessible when the sliding drawer is in an open position, and wherein the one or more stored items are concealed when the sliding drawer is in a closed position; and
   a retention spring configured to extend away from the back portion of the structural layer, the retention spring configured to apply pressure to the one or more items stored within the sliding drawer against the inner surface of the sliding drawer and prevent the one or more items from shifting within the drawer cavity when the sliding drawer is in the closed position.

2. The protective case of claim 1, wherein the drawer cavity of the sliding drawer is configured and sized to store a credit card or identification card.

3. The protective case of claim 1, wherein the sliding drawer further comprises a relief located at a bottom edge of the sliding drawer, the relief configured to allow easier access to remove the credit card or identification card from the sliding drawer.

4. The protective case of claim 1, wherein the drawer cavity of the sliding drawer is configured and sized to store two or more cards selected from the group of a credit card, an identification card, and a business card.

5. The protective case of claim 1, wherein the sliding drawer comprises one or more detents, the detents configured to engage with one or more corresponding recesses on the back surface of the structural layer, the one or more detents and the one or more corresponding recesses configured to secure the sliding drawer in the closed position.

6. The protective case of claim 5, wherein the one or more detents of the sliding drawer are located proximate a top edge of the sliding drawer.

7. The protective case of claim 1, wherein the sliding drawer is attached to the structural layer with a first rail disposed along a first edge of the sliding drawer and a second rail disposed along a second edge of the sliding drawer, the first rail configured to engage with a first rail receiver on the back surface of the structural layer and the second rail configured to engage with a second rail receiver on the back surface of the structural layer of the protective case.

8. A protective case for an electronic device, the case comprising:
   a structural layer comprising a cavity configured to receive the electronic device;
   a cushion layer configured to cover a portion of the electronic device, the cushion layer configured to fit within the cavity of the structural layer and provide cushioning support when the electronic device is installed in the protective case;
   a compartment slidably attached to a back surface of the structural layer of the protective case, the compartment having an open and a closed position, the compartment configured to store one or more items other than the electronic device; and
   a spring configured to exert force against the one or more items stored within the compartment to prevent the one or more items from shifting within the compartment when the compartment is in the closed position.

9. The protective case of claim 8, wherein the compartment comprises a first rail receiver disposed along a first edge and a second rail receiver along a second edge, the first rail receiver configured to engage a first rail located along the back surface of the structural layer and the second rail receiver configured to engage a second rail located along the back surface of the structural layer.

10. The protective case of claim 9, wherein the first rail receiver of the compartment comprises a first detent and the second rail receiver of the compartment comprises a second detent.

* * * * *